US012107956B2

(12) United States Patent
Gomi et al.

(10) Patent No.: US 12,107,956 B2
(45) Date of Patent: Oct. 1, 2024

(54) INFORMATION PROCESSING DEVICE, INFORMATION PROCESSING METHOD, AND NON-TRANSITORY COMPUTER READABLE STORAGE MEDIUM

(71) Applicant: Yahoo Japan Corporation, Tokyo (JP)

(72) Inventors: Hidehito Gomi, Tokyo (JP); Shuji Yamaguchi, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 162 days.

(21) Appl. No.: 17/688,700

(22) Filed: Mar. 7, 2022

(65) Prior Publication Data

US 2022/0417020 A1 Dec. 29, 2022

(30) Foreign Application Priority Data

Jun. 18, 2021 (JP) .................. 2021-101696

(51) Int. Cl.
| G06F 15/16 | (2006.01) |
| G06F 9/54 | (2006.01) |
| H04L 9/08 | (2006.01) |
| H04L 9/30 | (2006.01) |
| H04L 9/32 | (2006.01) |
| H04L 29/06 | (2006.01) |

(52) U.S. Cl.
CPC ............ *H04L 9/321* (2013.01); *H04L 9/0869* (2013.01); *H04L 9/0894* (2013.01); *H04L 9/3073* (2013.01)

(58) Field of Classification Search
CPC ..... H04L 9/321; H04L 9/0869; H04L 9/0894; H04L 9/3073
USPC ...................................................... 713/155
See application file for complete search history.

(56) References Cited

U.S. PATENT DOCUMENTS

| 11,809,494 | B2* | 11/2023 | Iwasaki | G06F 16/9024 |
| 2015/0121068 | A1* | 4/2015 | Lindemann | H04L 63/0823 |
| | | | | 713/169 |
| 2017/0243224 | A1* | 8/2017 | Kamal | G06Q 20/3224 |
| 2018/0191501 | A1* | 7/2018 | Lindemann | H04L 9/0833 |
| 2019/0114404 | A1* | 4/2019 | Nowak | H04W 12/06 |

(Continued)

FOREIGN PATENT DOCUMENTS

| JP | 2015-230520 A | 12/2015 |
| JP | 2017059153 A * | 3/2017 |
| JP | 2019-046044 A | 3/2019 |

OTHER PUBLICATIONS

Recommended Account Recovery Practices for FIDO Relying Parties (Year: 2019).*

(Continued)

*Primary Examiner* — Hamza N Algibhah
(74) *Attorney, Agent, or Firm* — Procopio, Cory, Hargreaves & Savitch LLP

(57) ABSTRACT

An information processing device according to the present application includes a control unit. The control unit acquires, from an authentication server in a state in which a first authenticator used for FIDO authentication and a second authenticator used for recovery for the FIDO authentication cooperate with each other, a recovery execution request that is transmitted from a user terminal including the second authenticator to the authentication server, and if the recovery execution request meets a predetermined authentication condition that is set in advance, notifies the user terminal including the second authenticator of a recovery execution permission.

7 Claims, 15 Drawing Sheets

(56) References Cited

U.S. PATENT DOCUMENTS

| | | | |
|---|---|---|---|
| 2020/0053074 A1* | 2/2020 | Lum | G06F 21/31 |
| 2020/0280550 A1* | 9/2020 | Lindemann | H04L 63/0428 |
| 2020/0374124 A1* | 11/2020 | Bahloul | H04L 9/3231 |
| 2021/0192037 A1* | 6/2021 | Ehrensvärd | H04L 9/3271 |
| 2022/0005046 A1* | 1/2022 | Kim | G06Q 20/38215 |
| 2022/0303127 A1* | 9/2022 | Khoury | H04L 67/55 |
| 2022/0309161 A1* | 9/2022 | Bhide | G06F 21/57 |
| 2022/0353256 A1* | 11/2022 | Cizer Kobrinsky | H04L 63/102 |
| 2022/0417020 A1* | 12/2022 | Gomi | H04L 9/321 |
| 2024/0012937 A1* | 1/2024 | Park | G06F 16/2255 |

OTHER PUBLICATIONS

What is Attribute Based Encryption? (Year: 2015).*
Attribute-Based Encryption for Fine-Grained Access Control of Encrypted Data (Year: 2006).*
FelDo: Recoverable FIDO2 Tokens Using Electronic IDs (Year: 2022).*
Implementation of an extended FIDO2 authenticator using Attribute-Based Signatures (Year: 2022).*
Evaluation of Account Recovery Strategies with FIDO2-based Passwordless Authentication (Year: 2021).*
Japanese Patent Office, Notice of Reasons for Refusal, Japanese Patent Application No. 2021-101696, dated Mar. 20, 2023, in 9 pages.
Yuto Okawa et al., Information Processing Society of Japan Report of Research, "Implementation of delegated authentication by extending FIDO2 using attribute-based encryption", dated Mar. 6, 2020, in 12 pages.

* cited by examiner

FIG.6

| COOPERATION ID | AUTHENTICATION SERVER | USER ID | PUBLIC KEY |
|---|---|---|---|
| Co1 | AUTHENTICATION SERVER A | U01 | PublicKey1 |
| Co2 | AUTHENTICATION SERVER A | U02 | PublicKey2 |
| Co3 | AUTHENTICATION SERVER B | U03 | PublicKey3 |
| Co4 | AUTHENTICATION SERVER C | U01 | PublicKey4 |
| ... | ... | ... | ... |

FIG.7

| USER ID | COOPERATION ID | ATTRIBUTE INFORMATION | AUTHENTICATION MEANS |
|---|---|---|---|
| U01 | Co1 | ATTRIBUTE #1 | AUTHENTICATION MEANS #1 |
| ... | ... | ... | ... |

FIG.8

| SERVICE | AUTHENTICATION SERVER | SECRET KEY |
|---|---|---|
| SERVICE A | AUTHENTICATION SERVER A | PrivateKey1 |
| SERVICE C | AUTHENTICATION SERVER C | PrivateKey2 |
| ... | ... | ... |

INFORMATION PROCESSING DEVICE, INFORMATION PROCESSING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2021-101696 filed in Japan on Jun. 18, 2021.

BACKGROUND OF THE INVENTION

1. Field of the Invention

The present invention relates to an information processing device, an information processing method, and an information processing program.

2. Description of the Related Art

In recent years, a technology for facilitating user authentication has been proposed. For example, an authentication technology called FIDO (registered trademark) has been proposed (Japanese Patent Laid-Open No. 2015-230520).

However, there is a room for improvement in easier introduction of an FIDO authentication technology. Specifically, when introducing the FIDO authentication technology, it is necessary to add a function corresponding to FIDO to an authentication server or modify the authentication server, which may be a barrier against introduction of FIDO.

SUMMARY OF THE INVENTION

An information processing device includes a control unit that acquires, from an authentication server in a state in which a first authenticator used for FIDO authentication and a second authenticator used for recovery for the FIDO authentication cooperate with each other, a recovery execution request that is transmitted from a user terminal including the second authenticator to the authentication server, and if the recovery execution request meets a predetermined authentication condition that is set in advance, notifies the user terminal including the second authenticator of a recovery execution permission.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of public key information according to the embodiment;

FIG. 7 is a diagram illustrating an example of user information according to the embodiment;

FIG. 8 is a diagram illustrating an example of secret key information according to the embodiment;

DETAILED DESCRIPTION OF THE PREFERRED EMBODIMENTS

Figure 1:
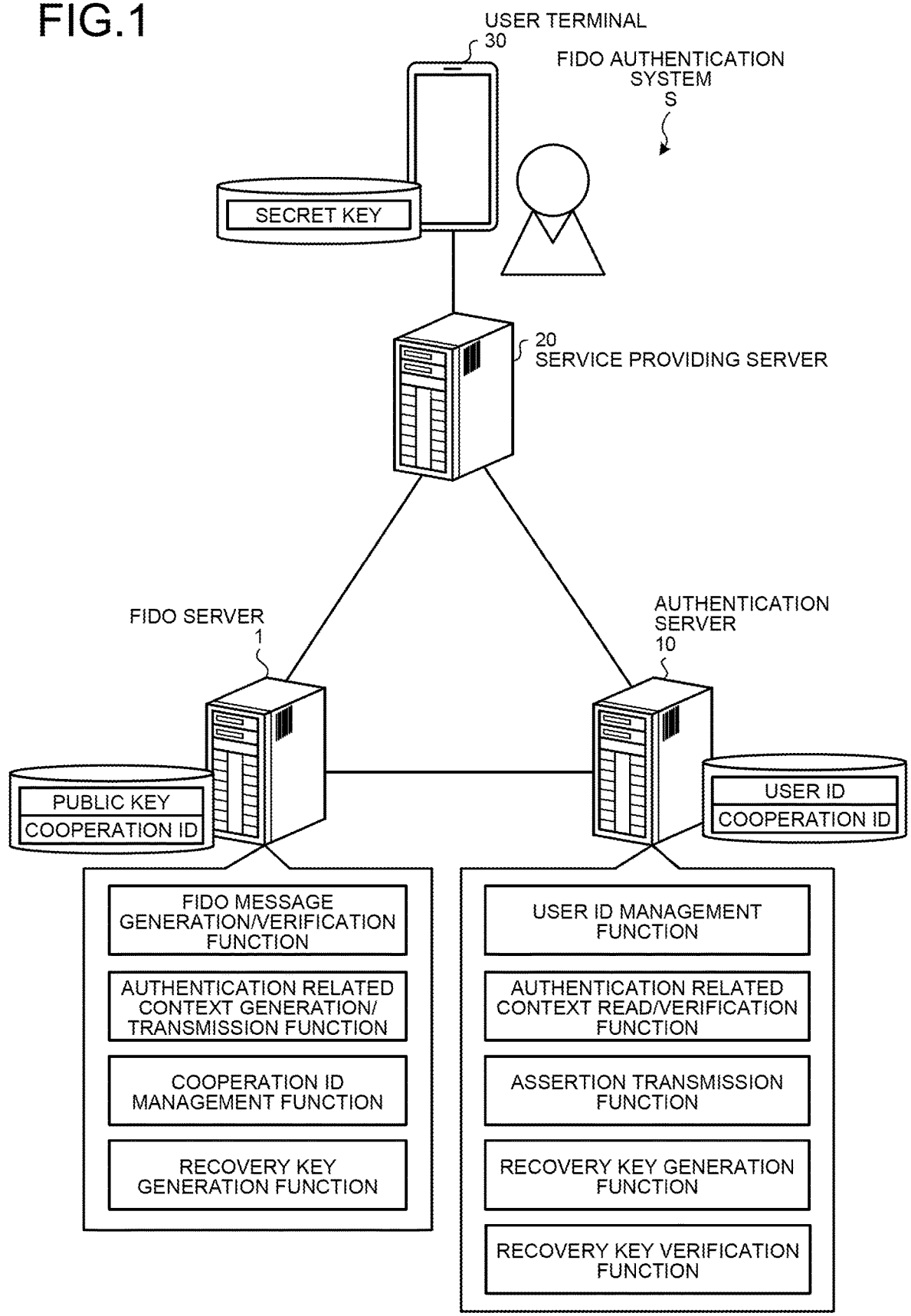
FIG. 1 is a diagram illustrating a configuration example of an authentication system according to an embodiment.

Modes (hereinafter, described as "embodiments") for carrying out an information processing device, an information processing method, and an information processing program according to the present application will be described in detail below with reference to the drawings. The information processing device, the information processing method, and the information processing program according to the present application are not limited by the embodiments below. Further, in each of the embodiments described below, the same components are denoted by the same reference symbols, and repeated explanation will be omitted.

Embodiment

Various services on the Internet typically adopt remote authentication using a password and an identifier (ID). In the remote authentication, the password and the ID are transmitted from a client device to an authentication server via a network, such as the Internet. For example, when a user logs into a service, the user enters the password and the ID. Subsequently, the authentication server verifies whether the received password is an appropriate password that is associated with the ID stored in the authentication server.

One of problems related to the remote authentication is that a user repeatedly uses a single password among a plurality of services. The user generally has a plurality of accounts for a plurality of services, such as an electronic mail, a social networking service (SNS), an online video platform, online shopping, and online banking. In some cases, if the user sets a different password for each of the services, it may be difficult for the user to remember the plurality of different passwords for the respective services. Therefore, the user may use a common password for a plurality of services. However, if one of the services leaks the password, a malicious person may fraudulently access a different one of the services by using the leaked password.

To solve the problem related to the remote authentication as described above, an authentication technology called FIDO has been proposed. In an authentication mode of FIDO, an identity of the user is verified by an authenticator that is incorporated in or externally attached to a user device, such as a smartphone. Examples of the authenticator include a biometric authentication function of the smartphone. In this manner, the FIDO authentication adopts local authentication.

In the local authentication, the authenticator uses a secret key stored in the authenticator and adds an electronic signature to an identity verification result. Further, the verification result with the electronic signature is transmitted from the user device to a service on the Internet. The service on the Internet is able to confirm validity of the verification result with the electronic signature transmitted from the user device, by using a public key that is registered in the service.

As described above, the FIDO authentication is able to implement passwordless authentication using the authenticator that is incorporated in or externally attached to the user device. For example, the user is able to perform passwordless login for a service that adopts the FIDO authentication, by inputting biological information, such as a fingerprint, into the smartphone. The FIDO authentication allows the user to log into a service without using a password, and therefore the FIDO authentication is preferable from the viewpoint of convenience and safety.

However, if a service provider is to introduce the FIDO authentication, it is necessary to add a function corresponding to the FIDO authentication to an authentication server, or modify the authentication server. In this case, the service provider needs to temporarily suspend provision of a service, or need to receive certification about whether the FIDO authentication normally works. This may be a barrier against introduction of FIDO.

Further, in the FIDO authentication, the user device (authenticator) is registered, and a public key and a secret key are generated as a pair at the time of registration. Furthermore, the secret key is stored in the authenticator and the public key is registered in the server. This makes it possible to perform authentication without using a password. However, in this type of authentication, the device owned by the user is registered (device-based authentication), and therefore, if the device is lost, stolen, or broken, the user is not able to perform authentication.

To cope with this, in the present disclosure, a FIDO server with a function to perform the FIDO authentication is arranged separately from an authentication server, and the authentication server is allowed to call the function of the FIDO authentication from the FIDO server. Further, safe and flexible recovery of an account can be realized when the registered authenticator is not available because the device including the authenticator is lost, stolen, broken, or the like.

FIG. 1 is a diagram illustrating a configuration example of an authentication system S according to an embodiment. As illustrated in FIG. 1, the authentication system S according to the embodiment includes a FIDO server 1, an authentication server 10, a service providing server 20, and a user terminal 30. The FIDO server 1, the authentication server 10, the service providing server 20, and the user terminal 30 are connected to a network (not illustrated) in a wired or wireless manner. Examples of the network include the Internet, a wide area network (WAN), and a local area network (LAN). Components of the authentication system S are able to perform communication with one another via the network. Meanwhile, operation example of the components of the authentication system S will be described in detail later with reference to FIG. 9 and subsequent drawings.

The user terminal 30 is a terminal device that is handled by a user who is to receive a service. As the user terminal 30, an arbitrary type of terminal device, such as a smartphone, a desktop personal computer (PC), a notebook PC, or a tablet PC, may be used.

Further, the user terminal 30 is able to use a service provided by the service providing server 20 by accessing the service providing server 20. In the present disclosure, user registration and authentication for receiving a service is performed by the FIDO authentication. Meanwhile, registration processes and authentication processes will be described in detail later with reference to FIG. 9 and subsequent drawings.

Furthermore, the user terminal 30 includes an authenticator for the FIDO authentication. The authenticator has a function to perform biometric authentication on the user, for example. The biometric authentication is performed by detecting biological information, such as a fingerprint, an iris, or a face. Meanwhile, the authenticator need not always be incorporated in the user terminal 30, but may be externally attached to the user terminal 30 by a universal serial bus (USB) key or the like. Moreover, the authenticator stores therein a secret key for adding an electronic signature to a user identity verification result. The secret key is generated as a key pair together with a public key (to be described later) by the authenticator.

The service providing server 20 is a server that provides various services. Examples of the services provided by the service providing server 20 include a browser, Internet shopping, an electronic commerce services including an online mall and the like.

If the user terminal 30 requests an access to a service, the service providing server 20 requests the authentication server 10 to authenticate the user, and permits the user terminal 30 to access the service if the authentication server 10 authenticates the user.

The authentication server 10 is a server that authenticates the identity of the user who has requested the access to the service. The authentication server 10 implements a registration process and an authentication process for the FIDO authentication by using the function of the FIDO server 1. Specifically, in a registration process of registering the user to the service, the authentication server 10 requests the FIDO server 1 to generate a message for causing the authenticator to generate a key pair that is needed for the FIDO authentication, or requests the FIDO server 1 to verify attestation information on the authenticator or verify attestation information that is transmitted from the authenticator.

Furthermore, as illustrated in FIG. 1, the authentication server 10 has a user ID management function, an authentication related context read/verification function, an assertion transmission function, a recovery key generation function, and a recovery key verification function.

The user ID management function is a function to store and use a user ID, which is an identifier for identifying the user, and a cooperation ID, which is used between the FIDO server 1 and the authentication server 10 as an identifier of the user, in an associated manner.

The authentication related context read/verification function is a function to read an authentication registration context or an authentication result context that is generated by the FIDO server 1, and verifies validity. The authentication registration context is a context that includes a verification result of the attestation information at the time of the registration process or information on a registered authentication means (biometric authentication or the like). The authentication result context is a context including a verification result of assertion information at the time of the authentication process, information on an authentication means implemented by the user, or the like.

The assertion transmission function is a function to transmit the assertion information generated by the authenticator to the FIDO server 1. The assertion information is information obtained by adding, with use of the secret key, a signature to an authentication result of the authenticator. Specifically, the assertion information is a signed certificate of the authentication result.

The recovery key generation function is a function to generate, with respect to a first authenticator that is normally used, a key pair for a second authenticator that is a backup for a case where the first authenticator is not available.

The recovery key verification function is a function to, when the first authenticator is not available, perform verification to authorize the second authenticator that is a backup.

The FIDO server 1 is an information processing device that performs a process related to the FIDO authentication. The FIDO server 1 is logically separated from the authentication server 10 and installed in the same domain or a different domain.

As illustrated in FIG. 1, the FIDO server 1 has a FIDO message generation/verification function, an authentication related context generation/transmission function, a cooperation ID management function, and a recovery key generation function.

The FIDO message generation/verification function is a function to generate or verify a message related to the FIDO authentication. Examples of the message related to the FIDO authentication include a credential generation option message (key pair generation instruction message), a message related to the attestation information, and a message related to the assertion information.

The authentication related context generation/transmission function is a function to generate the authentication registration context and the authentication result context as described above and transmit the authentication registration context and the authentication result context to the authentication server 10. The cooperation ID management function is a function to store and use the public key generated by the authenticator in association with the cooperation ID.

The recovery key generation function is a function to generate, with respect to the first authenticator that is normally used, a key pair for the second authenticator that is a backup for a case where the first authenticator is not available.

In this manner, in the authentication system S, the function related to the FIDO authentication is implemented by the FIDO server 1 and separated from the authentication server 10, so that the service provider need not add a function related to the FIDO authentication to the authentication server 10. Further, it is sufficient for the service provider to introduce a function to cooperate with the FIDO server 1 into the authentication server 10, so that it is possible to minimize modification of the authentication server 10. In other words, according to the FIDO server 1 that is the information processing device, it is possible to easily introduce the FIDO authentication technology.

A configuration example of each of the devices in the authentication system S will be described below with reference to FIG. 2 to FIG. 5.

Figure 2:
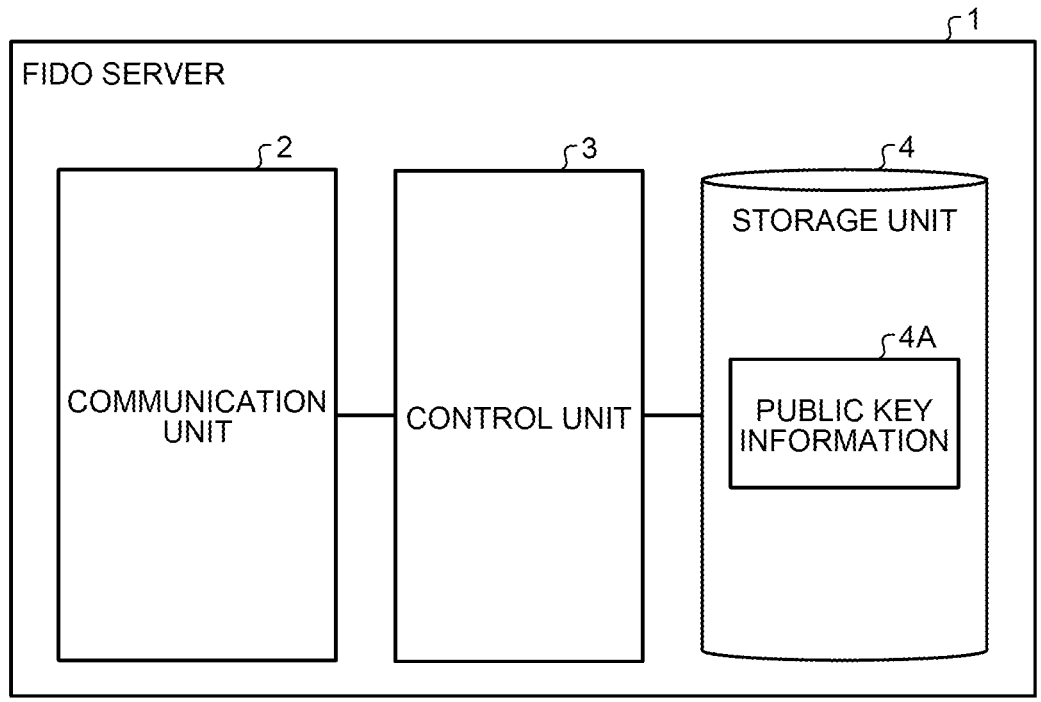
FIG. 2 is a diagram illustrating a configuration example of a FIDO server according to the embodiment.

FIG. 2 is a diagram illustrating a configuration example of the FIDO server 1 according to the embodiment. As illustrated in FIG. 2, the FIDO server 1 includes a communication unit 2, a control unit 3, and a storage unit 4.

The communication unit 2 is implemented by, for example, a network interface card (NIC) or the like. The communication unit 2 is connected to a network in a wired or wireless manner.

The control unit 3 is a controller and implemented by causing a processor, such as a central processing unit (CPU) or a micro processing unit (MPU), to execute various programs (corresponding to one example of the information processing program) stored in a storage device in the FIDO server 1 by using a random access memory (RAM) or the like as a work area. Further, the control unit 3 is a controller and may be implemented by an integrated circuit, such as an application specific integrated circuit (ASIC), a field programmable gate array (FPGA), or a general purpose graphic processing unit (GPGPU).

The storage unit 4 is implemented by, for example, a semiconductor memory device, such as a RAM or a flash memory, or a storage device, such as a hard disk or an optical disk. As illustrated in FIG. 2, the storage unit 4 includes public key information 4A. Meanwhile, the public key information 4A will be described in detail later with reference to FIG. 6.

Figure 3:
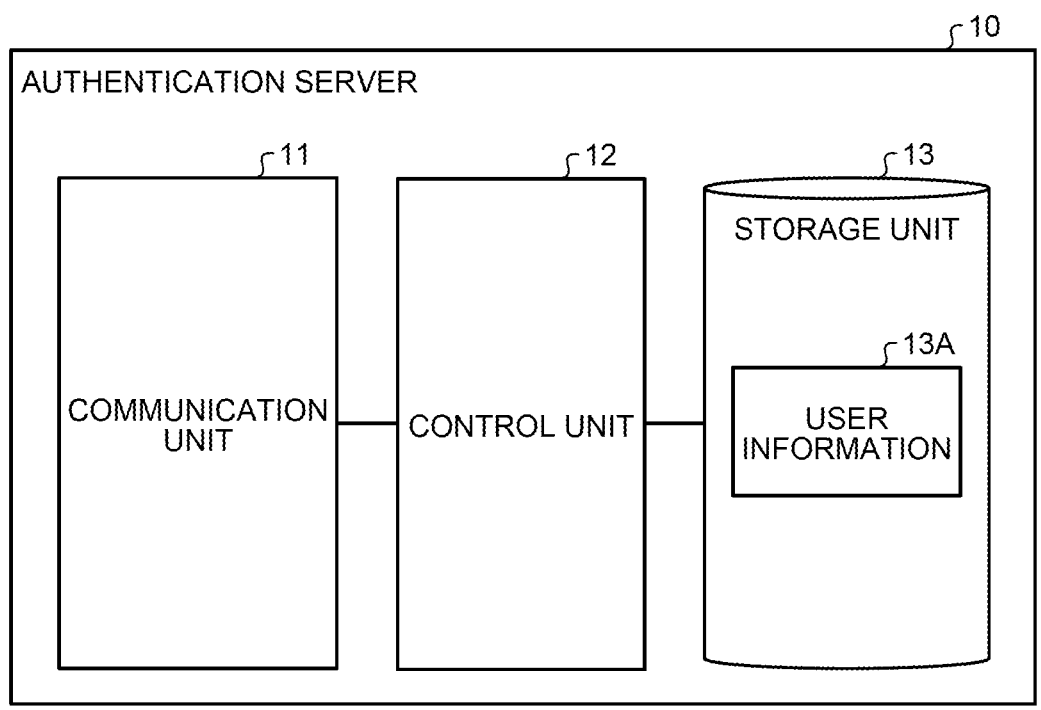
FIG. 3 is a diagram illustrating a configuration example of an authentication server according to the embodiment.

FIG. 3 is a diagram illustrating a configuration example of the authentication server 10 according to the embodiment. As illustrated in FIG. 3, the authentication server 10 includes a communication unit 11, a control unit 12, and a storage unit 13.

The communication unit 11 is implemented by, for example, an NIC or the like. The communication unit 2 is connected to a network in a wired or wireless manner.

The control unit 12 is a controller and implemented by causing a processor, such as a CPU or an MPU, to execute various programs (corresponding to one example of the information processing program) stored in the storage device in the FIDO server 1 by using a RAM or the like as a work area. Further, the control unit 12 is a controller and may be implemented by an integrated circuit, such as an ASIC, an FPGA, or a GPGPU.

The storage unit 13 is implemented by a semiconductor memory device, such as a RAM or a flash memory, or a storage device, such as a hard disk or an optical disk. As illustrated in FIG. 3, the storage unit 13 includes user information 13A. Meanwhile, the user information 13A will be described in detail later with reference to FIG. 7.

Figure 4:
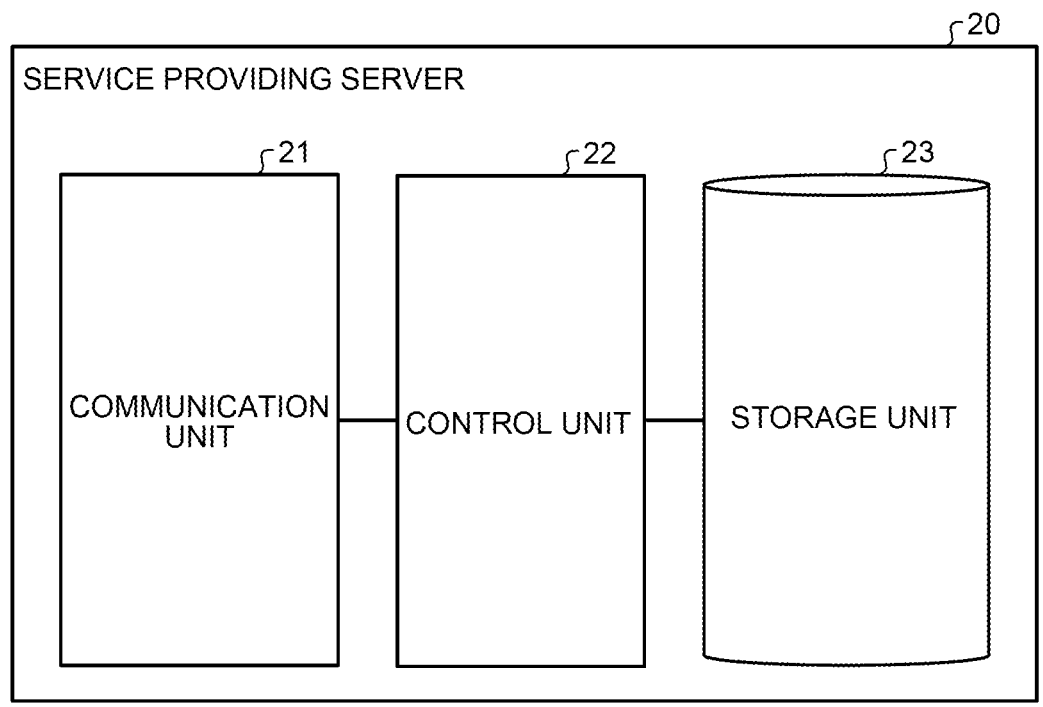
FIG. 4 is a diagram illustrating a configuration example of a service providing server according to the embodiment.

FIG. 4 is a diagram illustrating a configuration example of the service providing server 20 according to the embodiment. As illustrated in FIG. 4, the service providing server 20 includes a communication unit 21, a control unit 22, and a storage unit 23.

The communication unit 21 is implemented by, for example, an NIC or the like. The communication unit 2 is connected to the network in a wired or wireless manner.

The control unit 22 is a controller and implemented by causing a processor, such as a CPU or an MPU, to execute various programs (corresponding to one example of the information processing program) stored in the storage device in the FIDO server 1 by using a RAM or the like as a work area. Further, the control unit 22 is a controller and may be implemented by an integrated circuit, such as an ASIC, an FPGA, or a GPGPU.

The storage unit 23 is implemented by a semiconductor memory device, such as a RAM or a flash memory, or a storage device, such as a hard disk or an optical disk.

Figure 5:
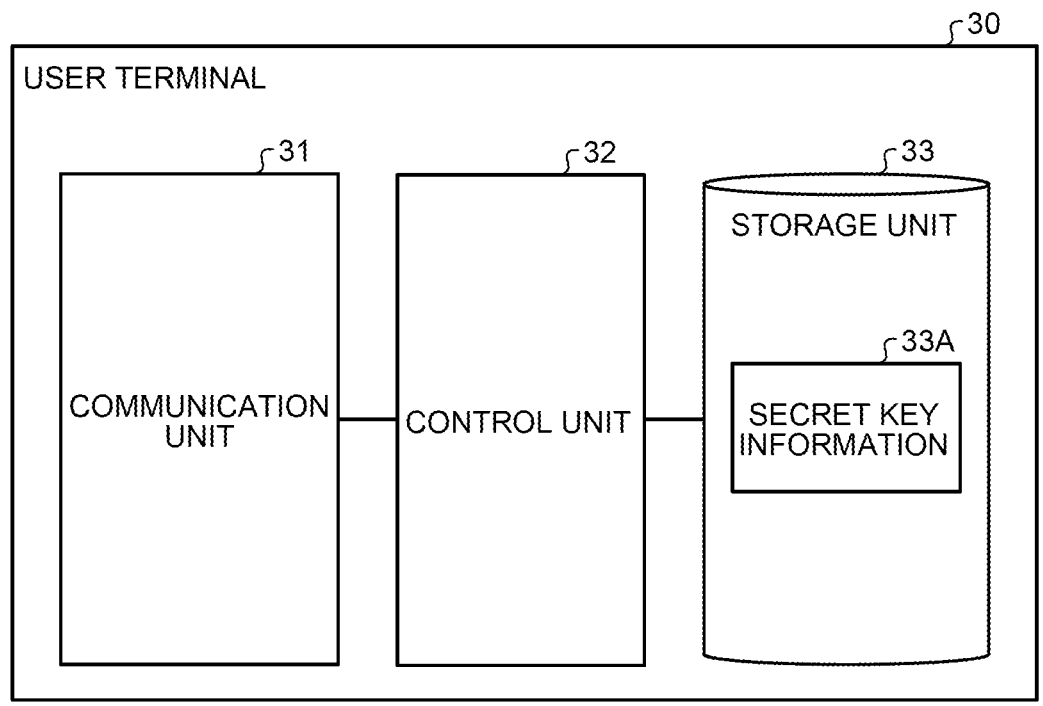
FIG. 5 is a diagram illustrating a configuration example of a user terminal according to the embodiment.

FIG. 5 is a diagram illustrating a configuration example of the user terminal 30 according to the embodiment. As illustrated in FIG. 5, the user terminal 30 includes a communication unit 31, a control unit 32, and a storage unit 33.

The communication unit 31 is implemented by, for example, an NIC or the like. The communication unit 2 is connected to the network in a wired or wireless manner.

The control unit 32 is a controller and implemented by causing a processor, such as a CPU or an MPU, to execute various programs (corresponding to one example of the information processing program) stored in the storage device in the FIDO server 1 by using a RAM or the like as a work area. Further, the control unit 32 is a controller and may be implemented by an integrated circuit, such as an ASIC, an FPGA, or a GPGPU.

The storage unit 33 is implemented by a semiconductor memory device, such as a RAM or a flash memory, or a storage device, such as a hard disk or an optical disk. As illustrated in FIG. 5, the storage unit 33 includes secret key information 33A. Meanwhile, the secret key information 33A will be described in detail later with reference to FIG. 8.

Public Key Information 4A

FIG. 6 is a diagram illustrating an example of the public key information 4A according to the embodiment. The public key information 4A is information that is stored in the storage unit 4 of the FIDO server 1 as described above, and includes information on the public key that is generated by the authenticator.

In the example illustrated in FIG. 6, the public key information 4A includes items of a "cooperation ID", an "authentication server", a "user ID", a "public key", and the like.

The "cooperation ID" is a user identifier that is used with the cooperating authentication server 10. The "authentication server" is information for identifying the cooperating authentication server 10. The "user ID" is an identifier that is issued by the authentication server 10 to identify the user. The "public key" is information on the public key.

User Information 13A

FIG. 7 is a diagram illustrating an example of the user information 13A according to the embodiment. The user information 13A is information that is stored in the storage unit 13 of the authentication server 10 as described above, and includes information on the user for whom the registration process for receiving a service is completed.

In the example illustrated in FIG. 7, the user information 13A includes items of a "user ID", a "cooperation ID", "attribute information", an "authentication means", and the like.

The "user ID" is an identifier for identifying the user. The "cooperation ID" is a user identifier that is used with the cooperating FIDO server 1. The "attribute information" is information on an attribute of the user. The "authentication means" is information on an authentication means adopted by the authenticator.

Secret Key Information 33A

FIG. 8 is a diagram illustrating an example of the secret key information 33A according to the embodiment. The secret key information 33A is information that is stored in the storage unit 33 of the user terminal 30 as described above, and includes information the secret key that is generated by the authenticator.

In the example illustrated in FIG. 8, the secret key information 33A includes items of a "service", an "authentication server", a "secret key", and the like.

The "service" is information for identifying a service for which authentication is to be performed. The "authentication server" is information for identifying the authentication server 10. The "secret key" is information on the secret key.

Operation examples of the authentication system S will be described below with reference to FIG. 9 to FIG. 14. Meanwhile, in the following, an operation example in a case where the FIDO server 1 and the authentication server 10 are installed in the same domain will be described with reference to FIG. 9 and FIG. 10, and an operation example in a case where the FIDO server 1 and the authentication server 10 are installed in different domains will be described with reference to FIG. 11 to FIG. 14.

First, the operation example in the case where the FIDO server 1 and the authentication server 10 are installed in the same domain will be described with reference to FIG. 9 and FIG. 10. In other words, the FIDO server 1 is arranged so as to be located as a backend of the authentication server 10.

Registration Process in the Same Domain

The registration process for a user in the authentication system S according to the embodiment will be described below with reference to FIG. 9. FIG. 9 is a sequence diagram illustrating an example of the registration process performed by the authentication system S according to the embodiment. Meanwhile, in FIG. 9, for convenience of explanation, the user terminal 30 and the authenticator are illustrated in a separate manner.

Figure 9:
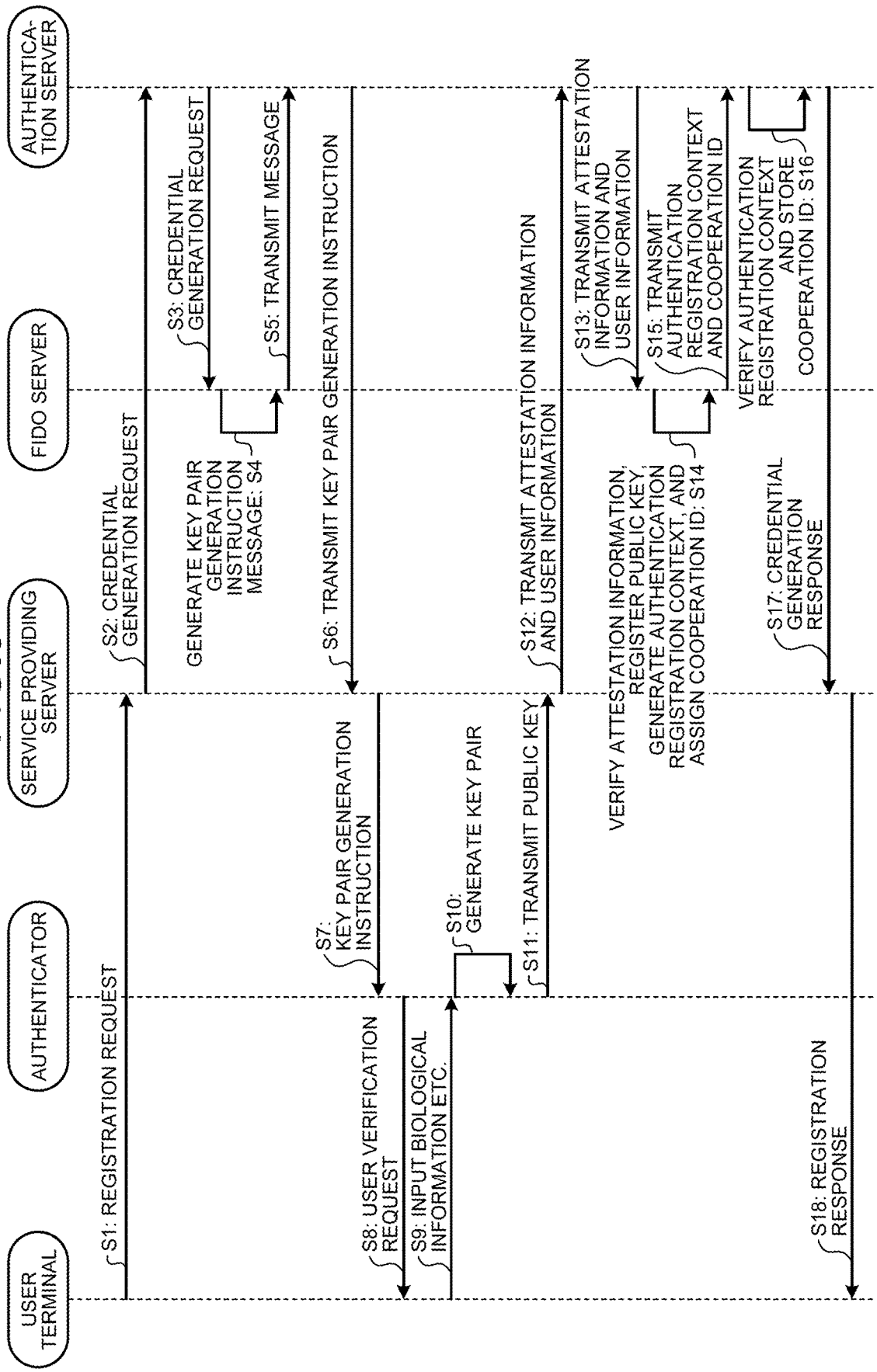
FIG. 9 is a sequence diagram illustrating an example of a registration process performed by the authentication system according to the embodiment.

The registration process illustrated in FIG. 9 is a process of registering the identity of a user with respect to a service for which authentication is needed. As illustrated in FIG. 9, first, the user terminal 30 transmits a registration request to the service providing server 20 (Step S1).

Subsequently, the service providing server 20 transmits a credential generation request to the authentication server 10 (Step S2). The credential generation request is a request for the authenticator to generate a key pair.

Then, the authentication server 10 transmits the acquired credential generation request to the FIDO server 1 (Step S3). Thereafter, the FIDO server 1 generates a key pair generation instruction message on the basis of the credential generation request (Step S4).

Subsequently, the FIDO server 1 transmits the generation instruction message to the authentication server 10 (Step S5).

Then, the authentication server 10 transmits the key pair generation instruction message to the service providing server 20 (Step S6).

Subsequently, the service providing server 20 transmits the key pair generation instruction message to the authenticator (Step S7). Namely, at Steps S1 to S7, the control unit 3 acquires, from the authentication server 10, the request for generating the key pair for the FIDO authentication, where the request has been transmitted to the authentication server 10 from the user terminal 30 including the authenticator for the FIDO authentication, generates the generation instruction to cause the authenticator to generate the key pair on the basis of the generation request, and notifies the authenticator of the generation instruction via the authentication server 10. In other words, the authentication server 10 does not have a function to generate a message (the generation instruction or an acquisition instruction to be described later) related to the FIDO authentication, and therefore requests the FIDO server 1 having the function to generate a message related to the FIDO authentication to generate a message. With this configuration, it is not necessary to introduce the message generation function related to the FIDO authentication into the authentication server 10, so that it is possible to easily introduce the FIDO authentication technology.

Subsequently, the authenticator transmits a user verification request (Step S8). The user verification request is a request for the user to input biological information or the like to the authenticator.

Then, the user terminal 30 inputs the biological information or the like to the authenticator in accordance with operation of the user (Step S9).

Subsequently, the authenticator generates a key pair (a secret key and a public key) (Step S10), and transmits the public key to the service providing server 20 (Step S11).

Then, the service providing server 20 transmits the attestation information and the user information (the biological information and the public key) to the authentication server 10 (Step S12). Meanwhile, at Step S12, the service providing server 20 may transmit additional information on the user with an approval of the user. The additional information includes, for example, location information on the user (location information on the user terminal 30). Further, the additional information may include behavior information, attribute information, or the like on the user.

Namely, the control unit 3 of the FIDO server 1 acquires the additional information together with the attestation information via the authentication server 10.

Subsequently, the authentication server 10 transmits the attestation information and the user information (the biological information and the public key) to the FIDO server 1 (Step S13).

Then, the FIDO server 1 verifies the attestation information, assigns a cooperation ID, registers the public key, and generates the authentication registration context indicating whether registration of the user is approved or not on the basis of the verification result of the attestation information (Step S14).

Subsequently, the FIDO server 1 transmits the authentication registration context and the cooperation ID to the authentication server 10 (Step S15). Namely, at Steps S10 to S15, the control unit 3 acquires, via the authentication server 10, the public key from the key pair that is generated by the authenticator in accordance with the generation instruction, stores the acquired public key in association with the cooperation ID, and notifies the authentication server 10 of the cooperation ID. Further, when acquiring the public key, the control unit 3 acquires the attestation information on the authenticator via the authentication server 10, generates the authentication registration context indicating whether registration of the user is approved or not on the basis of the verification result of the attestation information, and notifies the authentication server 10 of the authentication registration context. Meanwhile, if the FIDO server 1 acquires the additional information, the FIDO server 1 stores the additional information in association with the public key and the cooperation ID. In other words, the authentication server 10 does not have a function to verify the attestation information and assertion information (to be described later) (including a function to read the attestation information and the assertion information), and therefore requests the FIDO server 1 having the function to verify the attestation information and the assertion information to verify the attestation information and the assertion information. With this configuration, it is not necessary to introduce the function to verify the attestation information and the assertion information into the authentication server 10, so that it is possible to easily introduce the FIDO authentication technology.

Subsequently, the authentication server 10 verifies the authentication registration context and stores the cooperation ID in association with the user ID (Step S16).

Then, if there is no problem as a result of the verification of the authentication registration context, the authentication server 10 transmits a credential generation response to the service providing server 20 (Step S17). Subsequently, the service providing server 20 transmits a registration response indicating that the registration is completed to the user terminal 30 (Step S18).

Authentication Process in Same Domain

The authentication process on the user by the authentication system S according to the embodiment will be described below with reference to FIG. 10. FIG. 10 is a sequence diagram illustrating an example of the authentication process performed by the authentication system S according to the embodiment.

Figure 10:
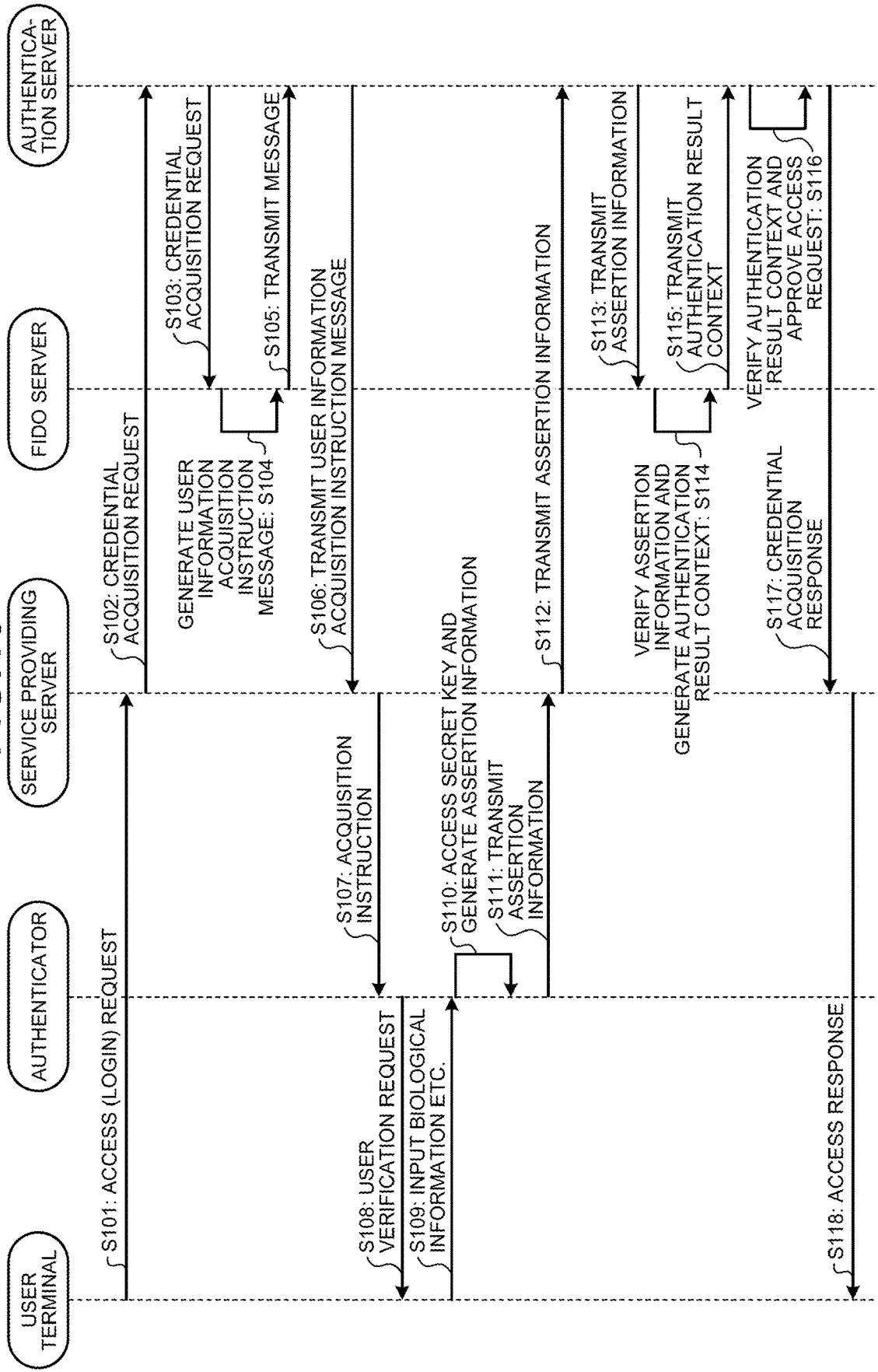
FIG. 10 is a sequence diagram illustrating an example of an authentication process performed by the authentication system according to the embodiment.

The authentication process illustrated in FIG. 10 is a process for, when the user requests an access (or login) to a service for which the identity is already registered, confirming the identity of the user and approves the access (login). As illustrated in FIG. 10, first, the user terminal 30 transmits an access (or login) request to the service providing server 20 (Step S101).

Subsequently, the service providing server 20 transmits a credential acquisition request to the authentication server 10 (Step S102). The credential acquisition request is a request (authentication request) that includes information on the user ID and that requests the authentication process on the identity of a user corresponding to the user ID.

Then, the authentication server 10 transmits the acquired credential acquisition request together with the cooperation ID to the FIDO server 1 (Step S103). Subsequently, the FIDO server 1 selects a corresponding public key on the basis of the credential acquisition request and the cooperation ID, and generates a user information acquisition instruction message for acquiring user information (authentication information, such as biological information) corresponding to the selected public key (Step S104).

Then, the FIDO server 1 transmits the acquisition instruction message to the authentication server 10 (Step S105).

Subsequently, the authentication server 10 transmits the user information acquisition instruction message for authentication to the service providing server 20 (Step S106).

Then, the service providing server 20 transmits the user information acquisition instruction message for authentication to the authenticator (Step S107). Namely, at Steps S101 to S107, the control unit 3 acquires, via the authentication server 10, the cooperation ID corresponding to the target user and the authentication request from the service providing server 20 to which the request for the access has been sent by the user terminal 30, generates an authentication information acquisition instruction corresponding to the cooperation ID, and notifies the authenticator of the acquisition instruction via the authentication server 10.

Subsequently, the authenticator transmits a user verification request on the basis of the acquisition instruction (Step S108). The user verification request is a request for the user to input the user information (biological information or the like) that is designated by the authenticator.

Then, the user terminal 30 inputs the biological information or the like to the authenticator in accordance with operation performed by the user (Step S109).

Subsequently, the authenticator accesses the secret key on the basis of the input biological information and generates the assertion information (Step S110). Specifically, the authenticator generates, as the assertion information, a certificate of signed authentication information that is obtained by adding a signature to the input biological information (authentication information) by using the corresponding secret key. Subsequently, the authenticator transmits the assertion information to the service providing server 20 (Step S111).

Then, the service providing server 20 transmits the assertion information to the authentication server 10 (Step S112). Meanwhile, at Step S112, the service providing server 20 may transmit the additional information on the user with an approval of the user. The additional information includes, for example, location information on the user (location information on the user terminal 30). Further, the additional information may include behavior information, attribute information, or the like on the user.

Namely, the control unit 3 of the FIDO server 1 acquires the additional information together with the attestation information via the authentication server 10.

Subsequently, the authentication server 10 transmits the assertion information to the FIDO server (Step S113).

Then, the FIDO server 1 verifies the assertion information and generates the authentication result context indicating whether the user is authenticated or not on the basis of the verification result of the assertion information (Step S114). Meanwhile, if the FIDO server 1 acquires the additional information together with the assertion information, the FIDO server 1 includes information based on the verification result of the additional information in the authentication result context.

Subsequently, the FIDO server 1 transmits the authentication result context to the authentication server 10 (Step S115). Namely, at Step S110 to S115, the control unit 3 acquires, via the authentication server 10, the assertion information that is obtained by adding, with use of the secret key, a signature to the authentication information that is acquired by the authenticator in accordance with the acquisition instruction, generates the authentication result context indicating whether the user is authenticated or not on the basis of the verification result of the assertion information, and notifies the authentication server 10 of the authentication result context.

Subsequently, the authentication server 10 verifies the authentication result context, and if there is no problem as a result of the verification, the authentication server 10 approves the request for the access to the service (Step S116), and transmits a credential acquisition response indicating the approval to the service providing server 20 (Step S117). Then, the service providing server 20 transmits an access response indicating that the access is approved to the user terminal 30 (Step S118), and provides the service to the user terminal 30.

Figure 12:
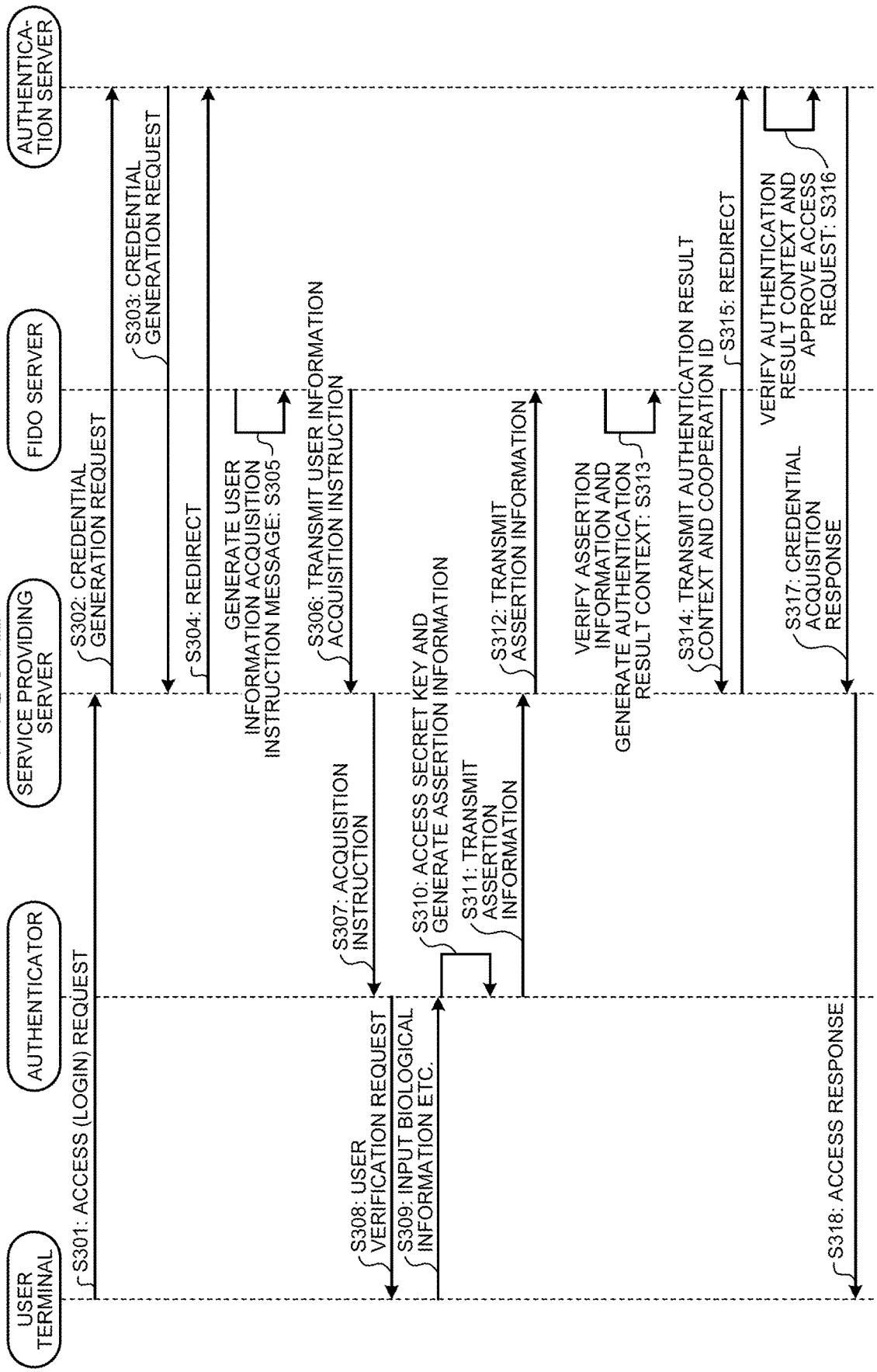
FIG. 12 is a sequence diagram illustrating an example of the authentication process performed by the authentication system according to the embodiment.
Figure 13:
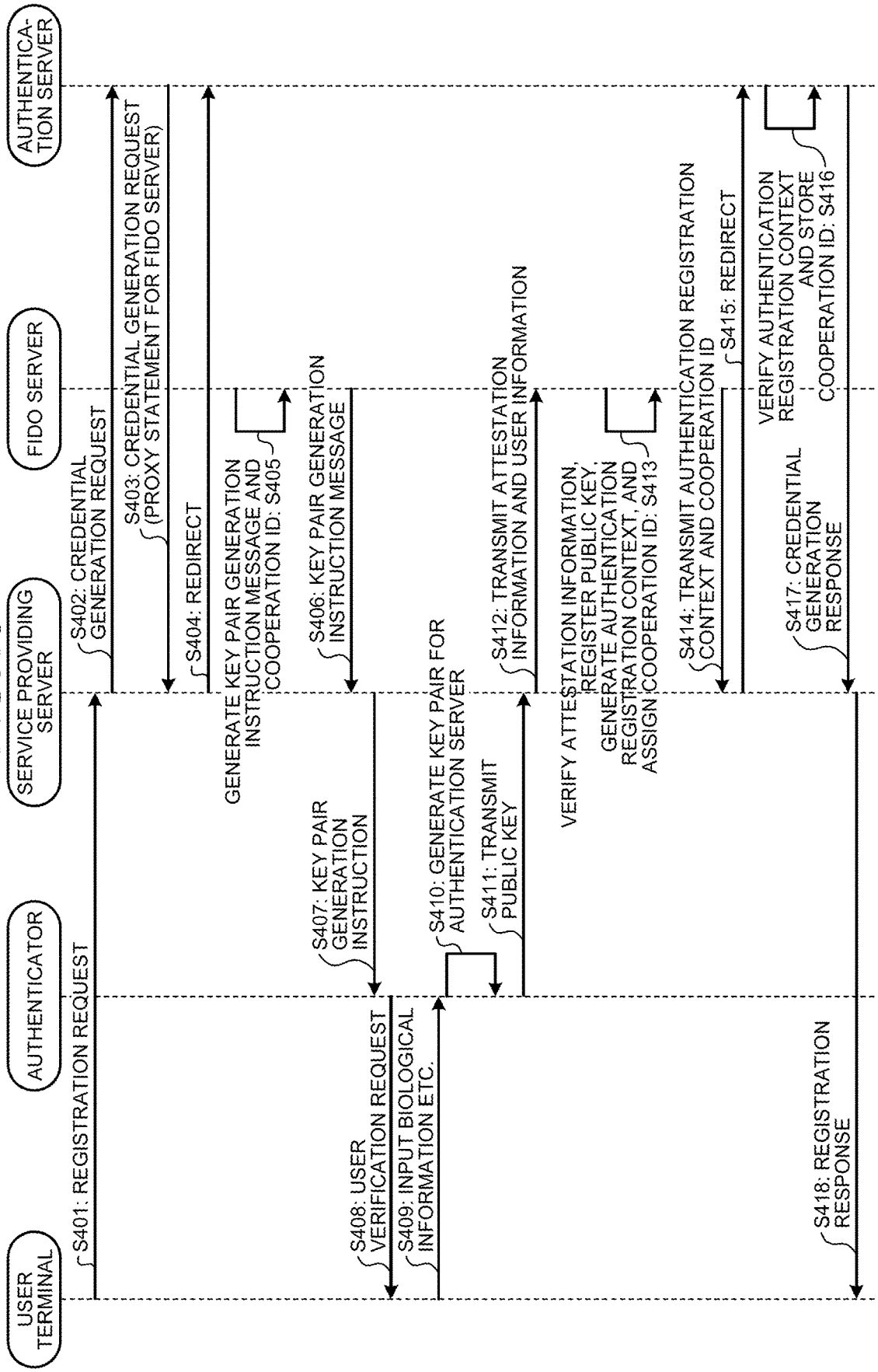
FIG. 13 is a sequence diagram illustrating an example of the registration process performed by the authentication system according to the embodiment.
Figure 14:
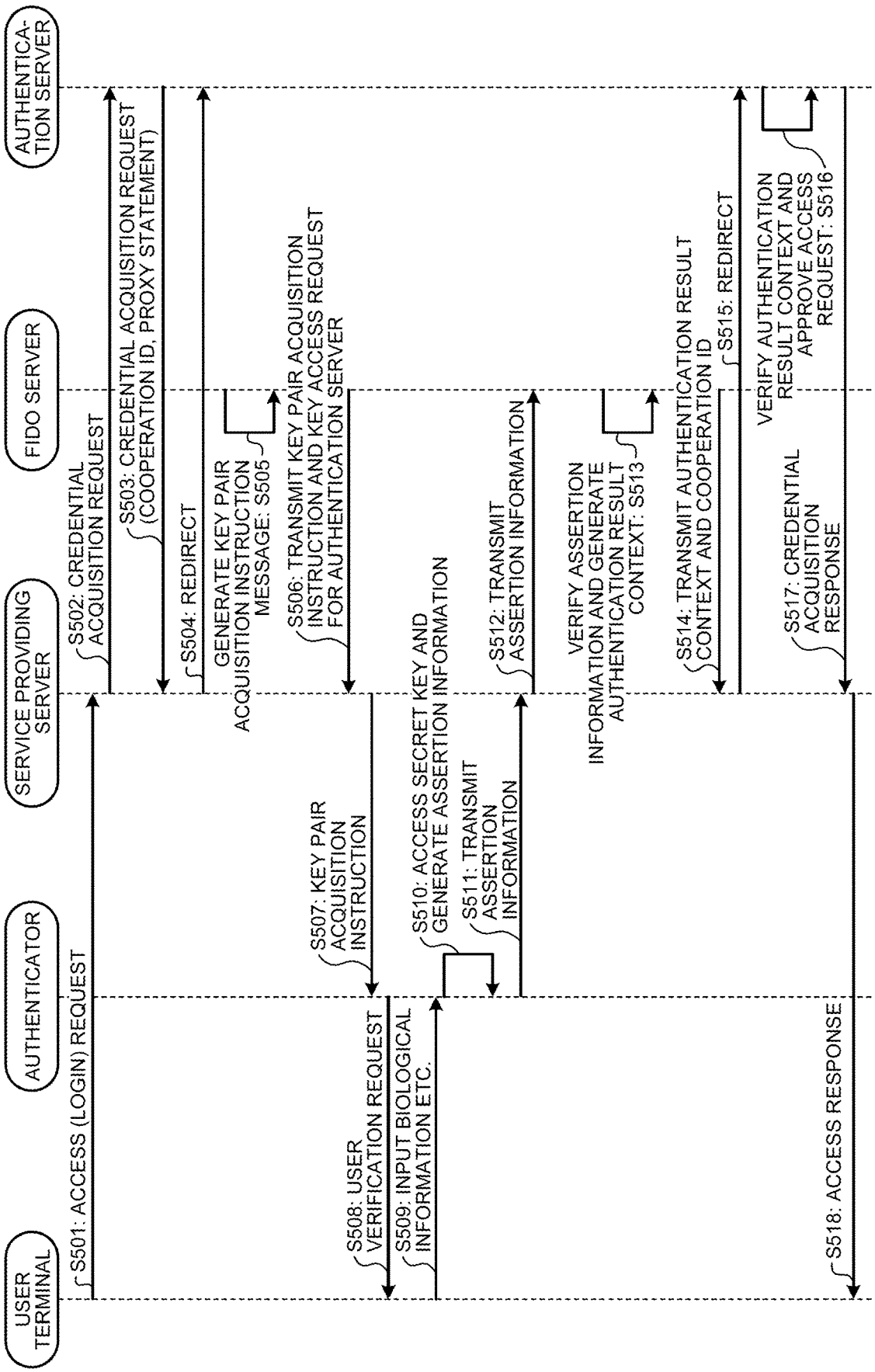
FIG. 14 is a sequence diagram illustrating an example of the authentication process performed by the authentication system according to the embodiment.

Operation examples in a case where the FIDO server 1 and the authentication server 10 are arranged in different domains will be described below with reference to FIG. 11 to FIG. 14. If the FIDO server 1 and the authentication server 10 are arranged in different domains, the authentication server 10 causes the service providing server 20 to perform redirect to transmit various requests to the FIDO server 1. An operation example in which the authentication server 10 is not clarified at the time of redirect is illustrated in FIG. 11 and FIG. 12, and an operation example in which the authentication server 10 is clarified by a proxy statement at the time of redirect is illustrated in FIG. 13 and FIG. 14.

Registration Process in Different Domains (First Case)

The registration process for a user in the authentication system S according to the embodiment will be described below with reference to FIG. 11. FIG. 11 is a sequence diagram illustrating an example of the registration process performed by the authentication system S according to the embodiment.

Figure 11:
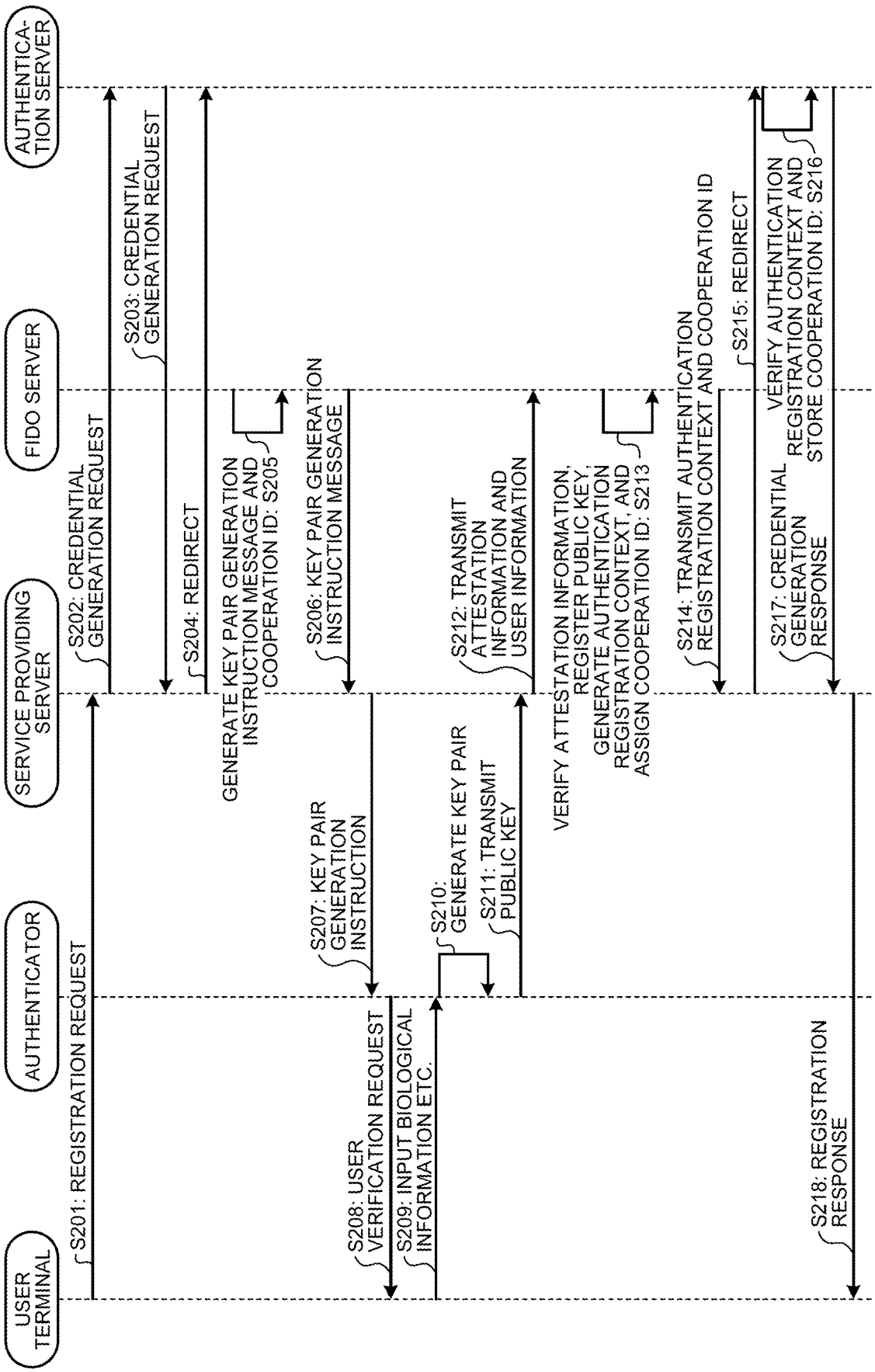
FIG. 11 is a sequence diagram illustrating an example of the registration process performed by the authentication system according to the embodiment.

As illustrated in FIG. 11, first, the user terminal 30 transmits a registration request to the service providing server 20 (Step S201).

Subsequently, the service providing server 20 transmits a credential generation request to the authentication server 10 (Step S202).

Then, the authentication server 10 returns the acquired credential generation request with information on a redirect destination (the FIDO server 1) to the service providing server 20 (Step S203), and the service providing server 20 redirects the credential generation request to the FIDO server 1 (Step S204). Thereafter, the FIDO server 1 generates a key pair generation instruction message on the basis of the credential generation request (Step S205).

Subsequently, the FIDO server 1 transmits the key pair generation instruction message to the service providing server 20 (Step S206).

Then, the service providing server 20 transmits the key pair generation instruction message to the authenticator (Step S207). Subsequently, the authenticator transmits a user verification request (Step S208). Namely, at Steps S201 to S207, the control unit 3 acquires, from the service providing server 20 via the authentication server 10, the request for generating the key pair for the FIDO authentication, where the request has been transmitted to the service providing server 20 from the user terminal 30 including the authenticator for the FIDO authentication, generates the generation instruction to cause the authenticator to generate the key pair on the basis of the generation request, and notifies the authenticator of the generation instruction via the service providing server 20. In other words, the authentication server 10 does not have the function to generate a message (the generation instruction or the acquisition instruction to be described later) related to the FIDO authentication, and therefore requests, via the service providing server 20, the FIDO server 1 having the function to generate a message related to the FIDO authentication to generate a message. With this configuration, it is not necessary to introduce the message generation function related to the FIDO authentication into the authentication server 10, so that it is possible to easily introduce the FIDO authentication technology.

Subsequently, the user terminal 30 inputs the biological information or the like to the authenticator in accordance with operation performed by the user (Step S209).

Then, the authenticator generates a key pair (a secret key and a public key) (Step S210), and transmits the public key to the service providing server 20 (Step S211).

Subsequently, the service providing server 20 transmits the attestation information and the user information (the biological information and the public key) to the FIDO server 1 (Step S212). Meanwhile, the service providing server 20 may transmit the additional information together with the attestation information.

Then, the FIDO server 1 verifies the attestation information, assigns a cooperation ID, registers the public key, and generates the authentication registration context on the basis of the verification result of the attestation information (Step S213).

Subsequently, the FIDO server 1 transmits the authentication registration context and the cooperation ID together with the information on the redirect destination (the authentication server 10) to the service providing server 20 (Step S214), and the service providing server 20 redirects the authentication registration context and the cooperation ID to the authentication server 10 (Step S215). Namely, at Step S210 to S215, the control unit 3 acquires, via the service providing server 20, the public key in the key pair that is generated by the authenticator in accordance with the generation instruction, stores the acquired public key in association with the cooperation ID, and notifies the authentication server 10 of the cooperation ID via the service providing server 20. Further, when acquiring the public key, the control unit 3 acquires the attestation information on the authenticator via the service providing server 20, generates the authentication registration context indicating whether registration of the user is approved or not on the basis of the verification result of the attestation information, and notifies the authentication server 10 of the authentication registration context via the service providing server 20. In other words, the authentication server 10 does not have the function to verify the attestation information and the assertion information (including the function to read the attestation information and the assertion information), and therefore requests, via the service providing server 20, the FIDO server 1 having the function to verify the attestation information and the assertion information to verify the attestation information and the assertion information, the attestation information. With this configuration, it is not necessary to introduce the function to verify the attestation information and the assertion information into the authentication server 10, so that it is possible to easily introduce the FIDO authentication technology.

Subsequently, the authentication server 10 verifies the authentication registration context and stores the cooperation ID in association with the user ID (Step S216).

Then, if there is no problem as a result of the verification of the authentication registration context, the authentication server 10 transmits a credential generation response to the service providing server 20 (Step S217). Subsequently, the service providing server 20 transmits a registration response indicating that the registration is completed to the user terminal 30 (Step S218).

Authentication Process in Different Domains (First Case)

The authentication process on the user by the authentication system S according to the embodiment will be described below with reference to FIG. 12. FIG. 12 is a sequence diagram illustrating an example of the authentication process performed by the authentication system S according to the embodiment.

As illustrated in FIG. 11, first, the user terminal 30 transmits an access (or login) request to the service providing server 20 (Step S301).

Subsequently, the service providing server 20 transmits the credential acquisition request to the authentication server 10 (Step S302). The credential acquisition request includes the information on the user ID.

Then, the authentication server 10 returns the acquired credential acquisition request together with the cooperation ID and the information on the redirect destination (the FIDO server 1) to the service providing server 20 (Step S303), and the service providing server 20 redirects the credential acquisition request and the cooperation ID to the FIDO server 1 (Step S304). Subsequently, the FIDO server 1 selects a corresponding public key on the basis of the credential acquisition request and the cooperation ID, and generates the user information acquisition instruction message for acquiring the user information (the biological information or the like for authentication) corresponding to the selected public key (Step S305).

Then, the FIDO server 1 transmits the acquisition instruction message to the service providing server 20 (Step S306).

Subsequently, the service providing server 20 transmits the user information acquisition instruction message for authentication to the authenticator (Step S307). Namely, at Step S301 to S307, when the user terminal 30 sends the request for the access to the service providing server 20, the control unit 3 acquires the cooperation ID corresponding to the target user and the authentication request from the service providing server 20 via the authentication server 10, generates the authentication information acquisition instruction corresponding to the cooperation ID, and notifies the authenticator of the acquisition instruction via the service providing server 20.

Subsequently, the authenticator transmits the user verification request on the basis of the acquisition instruction (Step S308). Then, the user terminal 30 inputs the biological information or the like to the authenticator in accordance with operation performed by the user (Step S309).

Subsequently, the authenticator accesses the secret key on the basis of the input biological information and generates the assertion information (Step S310). Specifically, the authenticator authenticates the user and generates an authentication result on the basis of the input biological information, and generates, as the assertion information, a certificate of a signed authentication result that is obtained by adding a signature to the authentication result by using the corresponding secret key. Subsequently, the authenticator transmits the assertion information to the service providing server 20 (Step S311).

Then, the service providing server 20 transmits the assertion information to the FIDO server 1 (Step S312). Meanwhile, the service providing server 20 may transmit the additional information together with the assertion information.

Subsequently, the FIDO server 1 verifies the assertion information and generates the authentication result context on the basis of the verification result of the assertion information (Step S313).

Then, the FIDO server 1 transmits the authentication result context and the cooperation ID together with the information on the redirect destination (the authentication server 10) to the service providing server 20 (Step S314), and the service providing server 20 redirects the authentication result context and the cooperation ID to the authentication server 10 (Step S315). Namely, at Step S310 to S315, the control unit 3 acquires, via the service providing server 20, the assertion information that is obtained by adding, with use of the secret key, the signature to the authentication information that is acquired by the authenticator in accordance with the acquisition instruction, generates the authentication result context indicating whether the user is authenticated or not on the basis of the verification result of the assertion information, and notifies the authentication server 10 of the authentication result context via the service providing server 20.

Subsequently, the authentication server 10 verifies the authentication result context, and if there is no problem as a result of the verification, the authentication server 10 approves the request for the access to the service (Step S316), and transmits the credential acquisition response indicating the approval to the service providing server 20 (Step S317). Then, the service providing server 20 transmits the access response indicating that the access is approved to the user terminal 30 (Step S318), and provides the service to the user terminal 30.

Operation examples in the case where the authentication server 10 is clarified by the proxy statement at the time of redirect will be described below with reference to FIG. 13 and FIG. 14.

Registration Process in Different Domains (Second Case)

The registration process for a user in the authentication system S according to the embodiment will be described below with reference to FIG. 13. FIG. 13 is a sequence diagram illustrating an example of the registration process performed by the authentication system S according to the embodiment.

As illustrated in FIG. 13, first, the user terminal 30 transmits a registration request to the service providing server 20 (Step S401).

Subsequently, the service providing server 20 transmits the credential generation request to the authentication server 10 (Step S402).

Then, the authentication server 10 returns the acquired credential generation request with a proxy statement for the FIDO server 1 together with the information on the redirect destination (the FIDO server 1) to the service providing server 20 (Step S403), and the service providing server 20 redirects the credential generation request to the FIDO server 1 (Step S404). The proxy statement is information that clearly indicates delegation of authority to the FIDO server 1 for performing registration for the FIDO authentication, and includes information on the authentication server 10 that has given the delegation. Thereafter, the FIDO server 1 generates the key pair generation instruction message on the basis of the credential generation request (Step S405).

Subsequently, the FIDO server 1 transmits the key pair generation instruction message to the service providing server 20 (Step S406).

Then, the service providing server 20 transmits the key pair generation instruction message to the authenticator (Step S407). Subsequently, the authenticator transmits the user verification request (Step S408).

Then, the user terminal 30 inputs the biological information or the like to the authenticator in accordance with operation performed by the user (Step S409).

Subsequently, the authenticator generates a key pair (a secret key and a public key) (Step S410), and transmits the public key to the service providing server 20 (Step S411).

Then, the service providing server 20 transmits the attestation information and the user information (the biological information and the public key) to the FIDO server 1 (Step S412).

Subsequently, the FIDO server 1 verifies the attestation information, assigns a cooperation ID, registers the public key, and generates the authentication registration context on the basis of the verification result of the attestation information (Step S413).

Then, the FIDO server 1 transmits the authentication registration context and the cooperation ID together with the information on the redirect destination (the authentication server 10) to the service providing server 20 (Step S414), and the service providing server 20 redirects the authentication registration context and the cooperation ID to the authentication server 10 (Step S415).

Subsequently, the authentication server 10 verifies the authentication registration context and stores the cooperation ID in association with the user ID (Step S416).

Then, if there is no problem as a result of the verification of the authentication registration context, the authentication server 10 transmits the credential generation response to the service providing server 20 (Step S417). Subsequently, the service providing server 20 transmits the registration response indicating that the registration is completed to the user terminal 30 (Step S418).

Authentication Process in Different Domains (Second Case)

The authentication process on the user by the authentication system S according to the embodiment will be described below with reference to FIG. 14. FIG. 14 is a sequence diagram illustrating an example of the authentication process performed by the authentication system S according to the embodiment.

As illustrated in FIG. 14, first, the user terminal 30 transmits an access (or login) request to the service providing server 20 (Step S501).

Subsequently, the service providing server 20 transmits the credential acquisition request to the authentication server 10 (Step S502). The credential acquisition request includes information on the user ID.

Then, the authentication server 10 returns the acquired credential acquisition request, the cooperation ID, and the information on the redirect destination (the FIDO server 1) together with the proxy statement for the FIDO server 1 to the service providing server 20 (Step S503), and the service providing server 20 redirects the credential acquisition request and the cooperation ID to the FIDO server 1 (Step S504). The proxy statement is information that clearly indicates delegation of authority to the FIDO server 1 for performing authentication for the FIDO authentication, and includes information on the authentication server 10 that has given the delegation. Thereafter, the FIDO server 1 selects a corresponding public key on the basis of the credential acquisition request and the cooperation ID, and generates the acquisition instruction message for the user information (the biological information or the like for authentication) corresponding to the selected public key (Step S505).

Then, the FIDO server 1 transmits the acquisition instruction message to the service providing server 20 (Step S506).

Subsequently, the service providing server 20 transmits the user information acquisition instruction message for authentication to the authenticator (Step S507).

Then, the authenticator the authenticator transmits the user verification request on the basis of the acquisition instruction (Step S508). Subsequently, the user terminal 30 inputs the biological information or the like to the authenticator in accordance with operation performed by the user (Step 3509).

Then, the authenticator accesses the secret key on the basis of the input biological information and generates the assertion information (Step S510). Specifically, the authenticator authenticates the user and generates an authentication result on the basis of the input biological information, and generates, as the assertion information, a certificate of a signed authentication result that is obtained by adding a signature to the authentication result by using the corresponding secret key. Subsequently, the authenticator transmits the assertion information to the service providing server 20 (Step S511).

Then, the service providing server 20 transmits the assertion information to the FIDO server 1 (Step S512).

Subsequently, the FIDO server 1 verifies the assertion information and generates the authentication result context on the basis of the verification result of the assertion information (Step S513).

Then, the FIDO server 1 transmits the authentication result context and the cooperation ID together with the information on the redirect destination (the authentication server 10) to the service providing server 20 (Step S514), and the service providing server 20 redirects the authentication result context and the cooperation ID to the authentication server 10 (Step S515).

Subsequently, the authentication server 10 verifies the authentication result context, and if there is no problem as a result of the verification, the authentication server 10 approves the request for the access to the service (Step S516), and transmits the credential acquisition response indicating the approval to the service providing server 20 (Step S517). Then, the service providing server 20 transmits the access response indicating that the access is approved to the user terminal 30 (Step S518), and provides the service to the user terminal 30.

Figure 15:
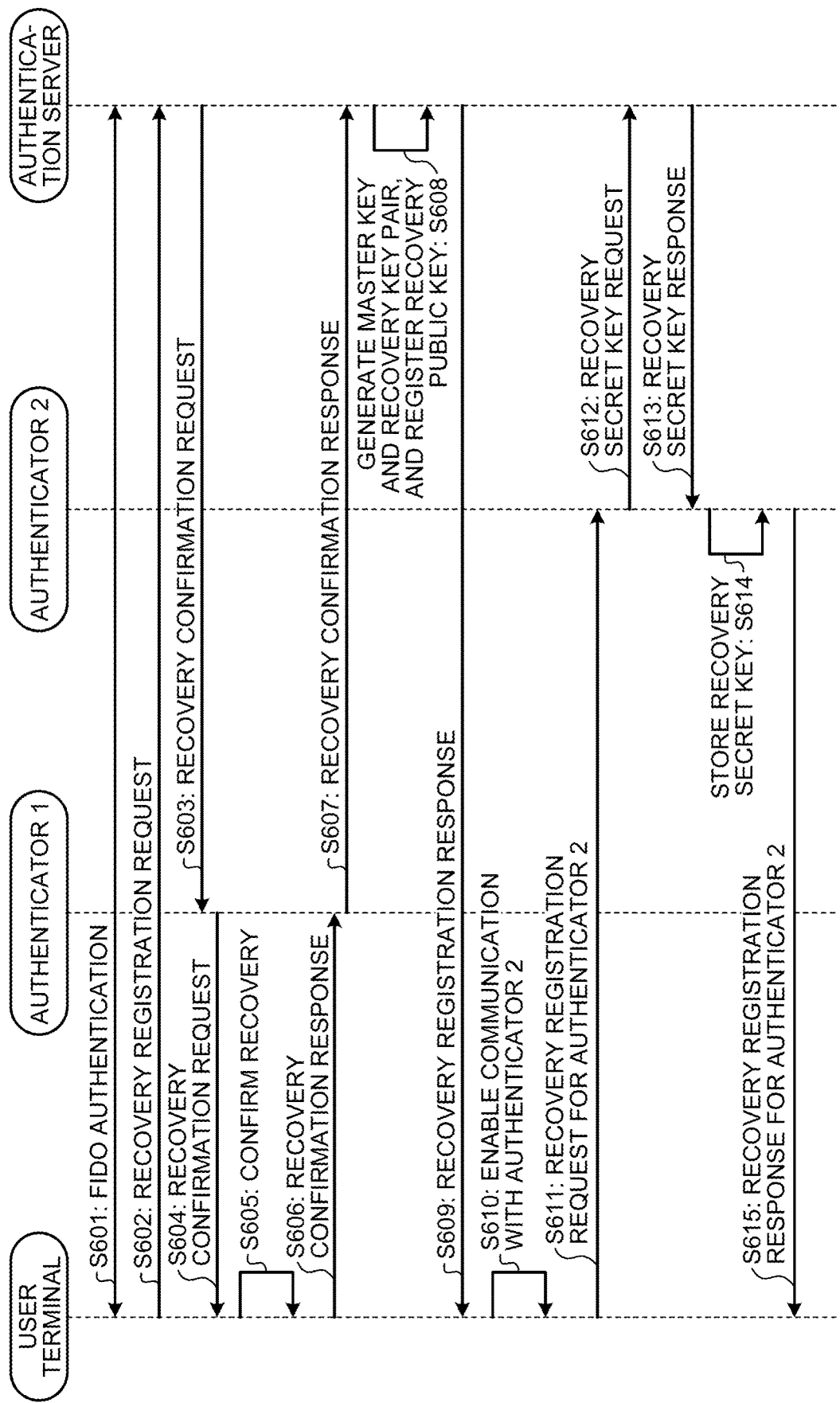
FIG. 15 is a sequence diagram illustrating an example of a recovery registration process performed by the authentication system according to the embodiment.
Figure 16:
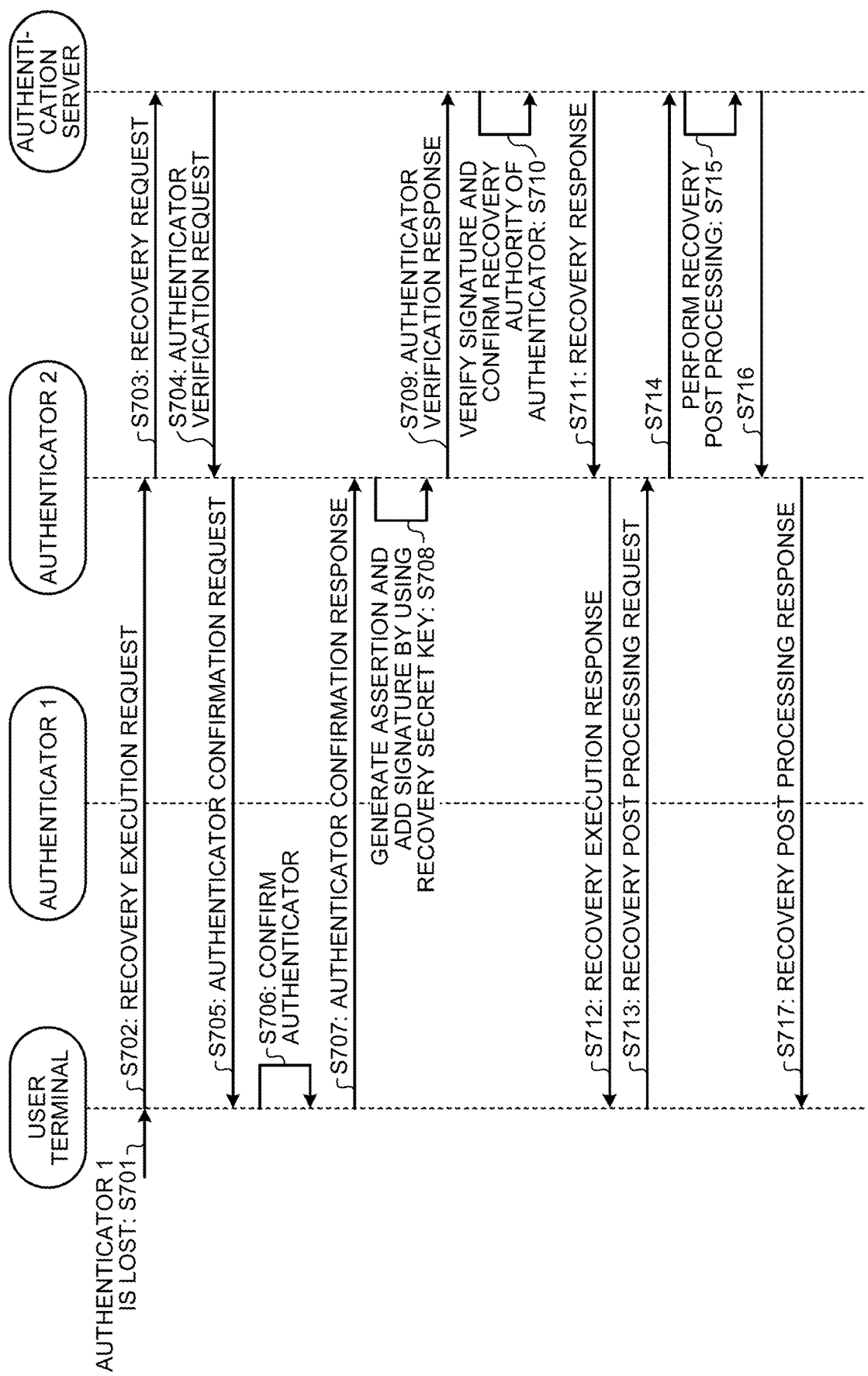
FIG. 16 is a sequence diagram illustrating an example of a recovery authentication process performed by the authentication system according to the embodiment.
Figure 17:
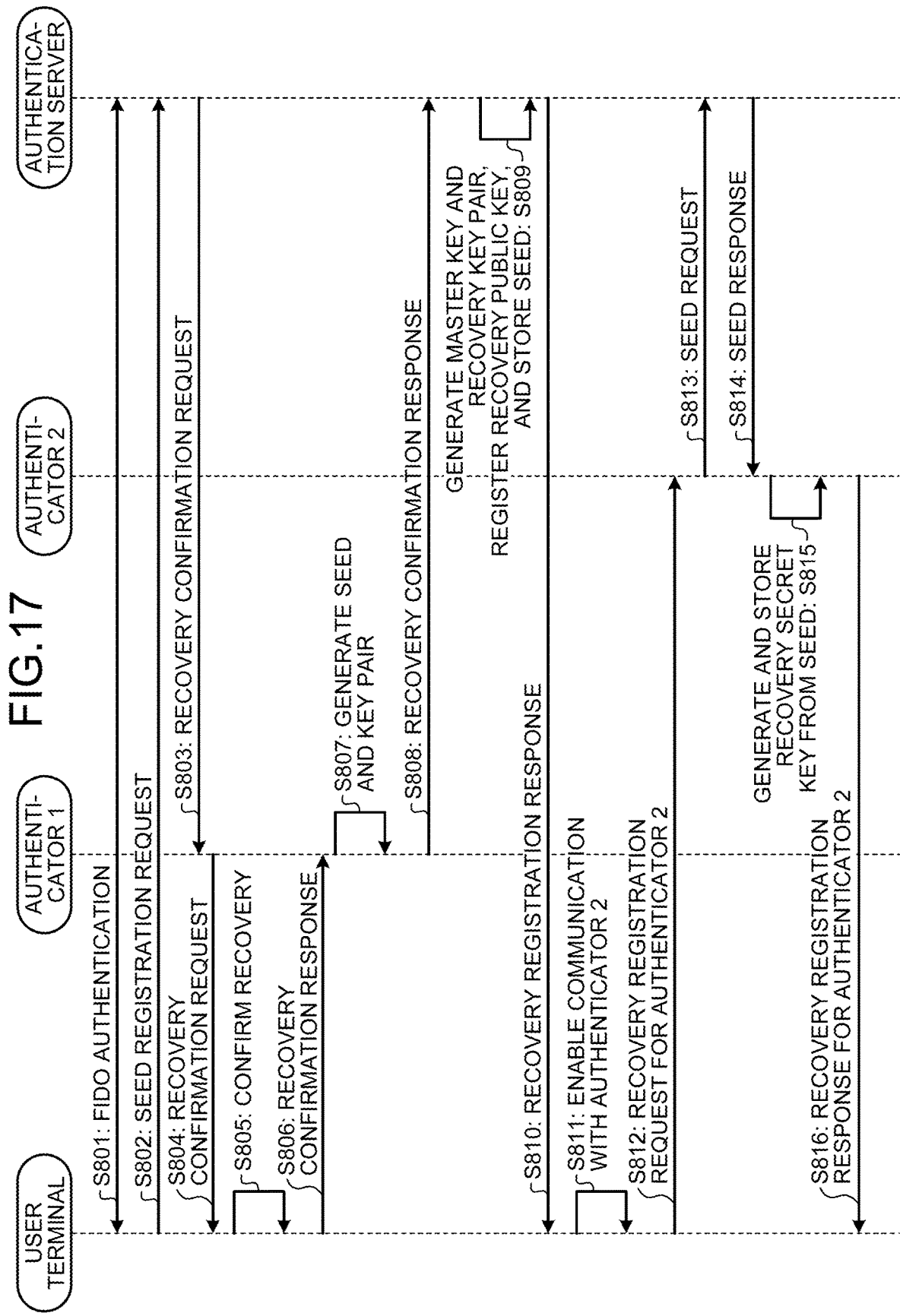
FIG. 17 is a sequence diagram illustrating an example of the recovery registration process performed by the authentication system according to the embodiment.

An operation example of recovery in the authentication system S will be described below with reference to FIG. 15 to FIG. 17. Meanwhile, in the above description, the service providing server 20 is provided between the user terminal 30 and both of the FIDO server 1 and the authentication server 10; however, in the description of FIG. 15 to FIG. 17, illustration and description of the service providing server 20 are omitted. Further, in the following, an operation example in which the FIDO server 1 and the authentication server 10 transmit a secret key that is used for attribute-based signature to perform recovery will be described with reference to FIG. 15 and FIG. 16, and an operation example in which the FIDO server 1 and the authentication server 10 transmit a seed for generating the secret key that is used for the attribute-based signature to perform recovery will be described with reference to FIG. 17.

The authentication system S according to the embodiment has a function to generate a recovery key pair for the second authenticator (AUTHENTICATOR 2) that is a backup for the first authenticator (AUTHENTICATOR 1) that is normally used, and a function to verify the recovery key pair for the second authenticator when the user terminal 30 including the first authenticator is not available. Further, the authentication system S introduces an attribute-based encryption technology between the key pair of the first authenticator and the recovery key pair of the second authenticator in an account system in which the FIDO authentication is introduced. The attribute-based encryption technology is one kind of public key encryption technologies, in which an attribute is associated with a cipher text or a key and only a user with a specific set of attributes can perform recovery. In the conventional public key encryption system, it is necessary to perform an encryption process the same number of times as the number of persons in accordance with issuance of secret keys. However, in the attribute-based encryption, a plurality of users can perform recovery for a certain single cypher text. Information (attributes) on a user who is allowed to perform recovery is embedded, as a control condition, in the cypher text, and only a person with the attributes (set) is allowed to recover encrypted data.

As application of the public key encryption, public key signature is known. In the public key encryption, data is encrypted by using the public key, and a person who received the encrypted data recovers the encrypted data by using a secret key corresponding to the public key. It is impossible to perform recovery without the secret key. In the attribute-based encryption, only a person who matches the attributes is allowed to perform recovery. In contrast, as for the signature, the signature is added to the data by using the secret key, and a receiver verifies the signature of the data by using the public key. The signature corresponding to the attribute-based encryption is called an attribute-based signature, and, even in the FIDO authentication, it is basic to verify the signature in the public key encryption. The authentication system S applies the attribute-based signature.

The operation example in which the FIDO server 1 and the authentication server 10 transmit the secret key that is used for the attribute-based signature to perform recovery will be described below with reference to FIG. 15 and FIG. 16.

Recovery Registration Process

The recovery registration process in the authentication system S according to the embodiment will be described below with reference to FIG. 15. FIG. 15 is a sequence diagram illustrating an example of the recovery registration process that is performed by the authentication system S according to the embodiment. Meanwhile, in FIG. 15, the first authenticator of the user terminal 30 being used and a second authenticator of a user terminal 30A as a backup are illustrated. Further, it is assumed that the process performed by the authentication server 10 includes a process performed by the FIDO server 1.

The recovery registration process illustrated in FIG. 15 is a process of registering the second authenticator (the user terminal 30A) that is a backup for re-performing authentication when the user terminal 30 (the first authenticator) being used is lost, stolen, broken, or the like. As illustrated in FIG. 15, first, the user performs the FIDO authentication with the authentication server 10 by using the user terminal 30 (Step S601). The FIDO authentication is performed by, for example, the user authentication process that is explained above with reference to FIG. 10.

Subsequently, the user transmits a recovery request to the authentication server 10 by using the user terminal 30 (Step S602). The recovery request is a request to register the second authenticator as a backup authenticator for the first authenticator. In this case, a cooperation ID of the second authenticator is transmitted as an attribute.

However, the attribute is not limited to the cooperation ID of the second authenticator. For example, it may be possible to adopt, as the attribute, information corresponding to a group of a person, such as a director group. Further, it may be possible to adopt a (chronological) location information data set, a context data set, or a behavior information set as the attribute. Furthermore, the attribute may be an attribute certificate. In this case, it may be necessary to verify the attribute information itself in some cases, and it may be possible to cause the authentication server 10 to verify the attribute information.

It may be possible to perform machine learning on the chronological data set of the location information adopted as the attribute, and if a predetermined location information data set meets a condition, it may be possible to transmit a location information certificate proving that the verification indicating that the condition is met has been performed to the authentication server 10.

Subsequently, the authentication server 10 transmits a confirmation of the acquired recovery request to the first authenticator (Step S603). Here, the authentication server 10 transmits the cooperation ID of the second authenticator to the first authenticator. Then, the first authenticator transmits the confirmation of the recovery request (the cooperation ID of the second authenticator) to the user terminal 30 (Step S604). The user confirms the recovery request (FIDO authentication) by using the user terminal 30 (Step S605).

Subsequently, the user transmits a response to the confirmation of the recovery request to the first authenticator by using the user terminal 30 (Step S606). Then, the first authenticator transmits the response to the confirmation of the recovery request (recovery confirmation assertion) to the authentication server 10 (Step S607).

The authentication server 10 generates a master key and a recovery key pair (a public key and a public key) with respect to the recovery confirmation response, and registers the recovery public key (Step S608). In this case, the recovery key pair is generated based on the attribute-based encryption.

Subsequently, the authentication server 10 transmits a recovery registration response to the user terminal 30 (Step S609). The user connects the user terminal 30A that is a backup to the user terminal 30 via, for example, a universal serial bus (USB) such that the user terminal 30 and the user terminal 30A are able to communicate with each other (Step S610). Then, the user transmits a recovery registration request to the second authenticator (the user terminal 30A) by using the user terminal 30 (Step S611). Subsequently, the second authenticator (the user terminal 30A) transmits a recovery secret key generation request to the authentication server 10 (Step S612).

Then, the authentication server 10 transmits, as a response to the recovery secret key generation request, a recovery secret key to the second authenticator (Step S613). The second authenticator registers and stores the recovery secret key (Step S614). Subsequently, the second authenticator transmits a registration response indicating that registration of the recovery secret key is completed to the user terminal 30 (Step S615).

Recovery Authentication Process

The recovery authentication process in the authentication system S according to the embodiment will be described below with reference to FIG. 16. FIG. 16 is a sequence diagram illustrating an example of the recovery authentication process performed by the authentication system S according to the embodiment.

The recovery authentication process illustrated in FIG. 16 is a process of performing authentication by using the user terminal 30A including the registered second authenticator when the user terminal 30 including the first authenticator is lost, stolen, broken, or the like. As illustrated in FIG. 16, the user terminal 30 including the first authenticator and owned by the user is lost, stolen, or broken (Step S701). At this time, the user first transmits a recovery execution request to the second authenticator by using the user terminal 30A that is a backup (Step S702). The recovery execution request is a request of registering the second authenticator as an authenticator used for recovery.

Subsequently, the second authenticator transmits the recovery execution request to the authentication server 10 (Step S703). Then, the authentication server 10 transmits an authenticator verification request to the second authenticator (Step S704). The second authenticator transmits an authenticator confirmation request to the user terminal 30A (Step S705). Subsequently, the user authenticates the second authenticator (FIDO) (Step S706). Then, the user transmits an authenticator confirmation response to the second authenticator by using the user terminal 30A (Step S707). The second authenticator generates an assertion with respect to the authenticator confirmation response, and adds a signature to the assertion by using the recovery secret key (Step S708).

Subsequently, the second authenticator transmits an authenticator verification response (signed assertion) to the authentication server 10 (Step S709). Then, the authentication server 10 verifies the signature using the recovery secret key, and confirms a recovery authority (access control) of the second authenticator (Step S710). Subsequently, the authentication server 10 transmits a recovery response to the second authenticator (Step S711).

Subsequently, the second authenticator transmits a recovery execution response to the user terminal 30A (Step S712). Then, the user transmits recovery post processing to the second authenticator by using the user terminal 30A (Step S713). The second authenticator transmits the recovery post processing to the authentication server 10 (Step S714). Subsequently, the authentication server 10 performs, as the recovery post processing, a process of deleting the public key of the first authenticator, for example (Step S715). The authentication server 10 transmits a recovery post processing response to the second authenticator (Step S716). The second authenticator transmits the recovery post processing response to the user terminal 30A (Step S717).

An operation example in a case where the FIDO server 1 and the authentication server 10 transmit a seed for generating the secret key that is used for the attribute-based signature to perform recovery will be described below with reference to FIG. 17.

Recovery Registration Process

The recovery registration process in the authentication system S according to the embodiment will be described below with reference to FIG. 17. FIG. 17 is a sequence diagram illustrating an example of the recovery registration process performed by the authentication system S according to the embodiment.

As illustrated in FIG. 17, first, the user performs the FIDO authentication with the authentication server 10 by using the user terminal 30 (Step S801). The FIDO authentication is performed by, for example, the user authentication process that is explained above with reference to FIG. 10.

Subsequently, the user transmits a seed registration request to the authentication server 10 by using the user terminal 30 (Step S802). The seed registration request is a request to register the second authenticator as a backup authenticator for the first authenticator. In this case, the cooperation ID of the second authenticator is transmitted as the attribute.

Then, the authentication server 10 transmits a confirmation of the acquired seed registration request to the first authenticator (Step S803). Here, the authentication server 10 transmits the cooperation ID of the second authenticator to the first authenticator. Subsequently, the first authenticator transmits a confirmation of the recovery request (the cooperation ID of the second authenticator) to the user terminal 30 (Step S804). The user confirms the recovery request (FIDO authentication) by using the user terminal 30 (Step S805).

Then, the user transmits a response to the confirmation of the recovery request to the first authenticator by using the user terminal 30 (Step S806). Subsequently, the first authenticator generates a seed in response to the confirmation response to the recovery request, and generates a recovery key pair (a public key and a public key) (Step S807). The first authenticator transmits a recovery confirmation response (recovery confirmation assertion and the seed) to the authentication server 10 (Step S808).

The authentication server 10 generates a master key and a recovery key pair (a public key and a public key) with respect to the recovery confirmation response, and stores the seed (Step S809). In this case, the recovery key pair is generated based on the attribute-based encryption.

Subsequently, the authentication server 10 transmits a recovery registration response (URL of the seed) to the user terminal 30 (Step S810). The user connects the user terminal 30A that is a backup to the user terminal 30 via, for example, a USB such that the user terminal 30 and the user terminal 30A are able to communicate with each other (Step S811). Then, the user transmits a recovery registration request (URL of the seed) to the second authenticator by using the user terminal 30 (Step S812). Subsequently, the second authenticator transmits a seed request to the authentication server 10 (Step S813).

Then, the authentication server 10 transmits, as a seed response to the seed request, a method of generating the seed and the secret key to the second authenticator (Step S814). The second authenticator generates a recovery secret key from the seed, and registers and stores the generated secret key (Step S815). Subsequently, the second authenticator transmits a registration response indicating that registration of the recovery secret key is completed to the user terminal 30 (Step S816).

The recovery authentication process is the same as the process described avoce with reference to FIG. 16.

In the recovery registration process and the recovery authentication process as described above, the single second authenticator is prepared as a backup for the first authenticator, but it may be possible to prepare a plurality of authenticators. Further, it is assumed that the authentication server 10 has a function to generate and verify the recovery key based on the attribute-based encryption, but the first authenticator may have the same function or a different device may have the function to generate and verify the recovery key. In other words, various methods may be adopted to transmit the secret key from the authentication server 10 to the second authenticator via the first authenticator. For example, it may be possible to directly transmit the secret key to the first authenticator, and share the information between the first authenticator and the second authenticator by using a two-dimensional code, such as a QR code (registered trademark), or various communication devices. Furthermore, the authentication server 10 may notify the second authenticator of a URL of a service for accessing the secret key via the first authenticator, and the second authenticator may obtain the secret key by accessing the URL. Moreover, it may be possible to use an information sharing method, such as a Diffie-Hellman key exchange. Furthermore, it may be possible to adopt a group signature technique as an alternative technique. Moreover, the second authenticator may store therein a plurality of secret keys.

Others

Of the processes described in the embodiments above, all or part of a process described as being performed automatically may also be performed manually. Alternatively, all or part of a process described as being performed manually may also be performed automatically by known methods. In addition, the processing procedures, specific names, and information including various kinds of data and parameters illustrated in the above-described document and drawings may be arbitrarily changed unless otherwise specified. For example, various kinds of information illustrated in each of the drawings are not limited to the information illustrated in the drawings.

Further, the components illustrated in the drawings are functionally conceptual and do not necessarily have to be physically configured in the manner illustrated in the drawings. In other words, specific forms of distribution and integration of the device are not limited to those illustrated in the drawings, and all or part of the devices may be functionally or physically distributed or integrated in arbitrary units depending on various loads or use conditions.

For example, all or part of the storage unit 4 illustrated in FIG. 2, the storage unit 13 illustrated in FIG. 3, the storage unit 23 illustrated in FIG. 5, and the storage unit 33 illustrated in FIG. 6 need not always be held by each of the devices, but may be held in a storage server or the like. In this case, each of the devices acquires various kinds of information by accessing the storage server.

Hardware Configuration

Figure 18:
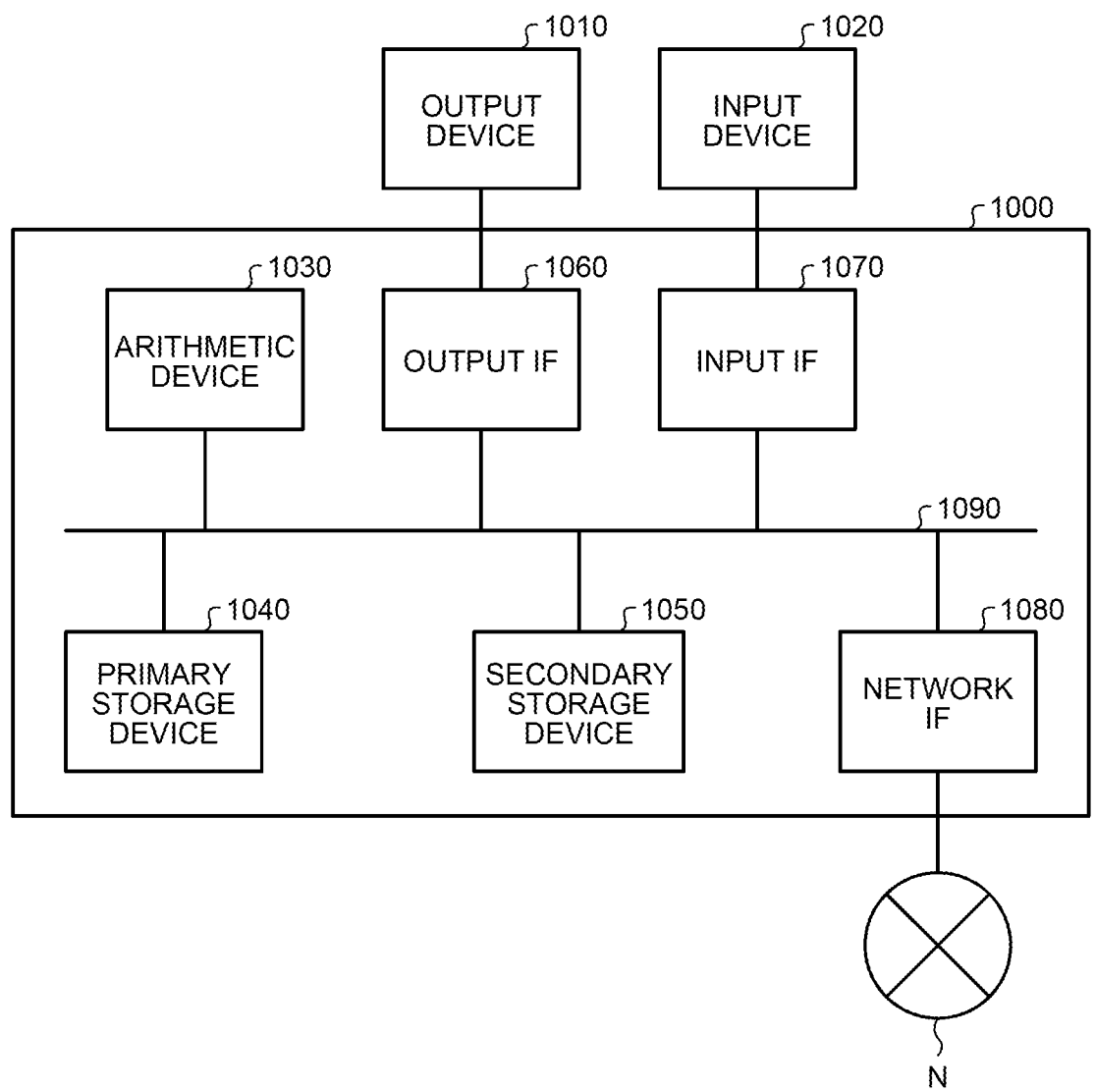
FIG. 18 is a diagram illustrating an example of a hardware configuration.

Moreover, the FIDO server 1 according to the embodiment as described above is implemented by, for example, a computer 1000 configured as illustrated in FIG. 18. FIG. 18 is a diagram illustrating an example of a hardware configuration. The computer 1000 is connected to an output device 1010 and an input device 1020, and includes an arithmetic device 1030, a primary storage device 1040, a secondary storage device 1050, an output interface (IF) 1060, an input IF 1070, and a network IF 1080 that are connected to one another via a bus 1090.

The arithmetic device 1030 operates on the basis of a program stored in the primary storage device 1040 or the secondary storage device 1050, a program read from the input device 1020, or the like, and performs various processes. The primary storage device 1040 is a memory device, such as a RAM, for temporarily storing data that is used by the arithmetic device 1030 to perform various calculations. Further, the secondary storage device 1050 is a storage device in which data used by the arithmetic device 1030 to perform various calculations and various databases, and is implemented by a read only memory (ROM), a hard disk drive (HDD), a flash memory, or the like.

The output IF 1060 is an interface for transmitting output target information to the output device 1010, such as a monitor or a printer, for outputting various kinds of information, and is implemented by a connector standardized by, for example, a USB, a digital visual interface (DVI), or a high definition multimedia interface (HDMI) (registered trademark). Further, the input IF 1070 is an interface for receiving information from the input device 1020 of various types, such as a mouse, a keyboard, and a scanner, and is implemented by, for example, a USB or the like.

Meanwhile, the input device 1020 may be a certain device that reads information from, for example, an optical recording medium, such as a compact disk (CD), a digital versatile disk (DVD), or a phase change rewritable disk (PD), a magneto optical recording medium, such as an magneto-optical (MO) disk, a tape medium, a magnetic recording medium, a semiconductor memory, or the like. Furthermore, the input device 1020 may be an externally-attached storage medium, such as a USB memory.

The network IF 1080 receives data from a different device via a network N, sends the received data to the arithmetic device 1030, and transmits data generated by the arithmetic device 1030 to a different device via the network N.

The arithmetic device 1030 controls the output device 1010 and the input device 1020 via the output IF 1060 or the input IF 1070. For example, the arithmetic device 1030 loads a program from the input device 1020 or the secondary storage device 1050 onto the primary storage device 1040, and executes the loaded program.

For example, if the computer 1000 functions as the FIDO server 1, the arithmetic device 1030 of the computer 1000 executes a program loaded on the primary storage device 1040 and implements the functions of the control unit 3.

Effects

As described above, the information processing device (the FIDO server 1) according to the embodiment includes the control unit 3. The control unit 3 acquires, from the authentication server 10, the request for generating the key pair for the FIDO authentication, where the request has been transmitted to the authentication server 10 from the user terminal 30 including the authenticator for the FIDO authentication, generates the generation instruction to cause the authenticator to generate the key pair on the basis of the generation request, and notifies the authenticator of the generation instruction via the authentication server 10. The control unit 3 acquires, via the authentication server 10, the public key from the key pair that is generated by the authenticator in accordance with the generation instruction, stores the acquired public key in association with the cooperation ID, and notifies the authentication server 10 of the cooperation ID. The control unit 3, when acquiring the public key, acquires the attestation information on the authenticator via the authentication server 10, generates the authentication registration context indicating whether registration of the user is approved on the basis of the verification result of the attestation information, and notifies the authentication server 10 of the authentication registration context. The control unit 3 acquires, via the authentication server 10, the cooperation ID corresponding to the target user and the authentication request from the service providing server 20 to which the request for the access has been sent by the user terminal 30, generates the authentication information acquisition instruction corresponding to the cooperation ID, and notifies the authenticator of the acquisition instruction via the authentication server 10. The control unit 3 acquires, via the authentication server 10, the assertion information that is obtained by adding, with use of the secret key, a signature to the authentication information that is acquired by the authenticator in accordance with the acquisition instruction, generates the authentication result context indicating whether the user is authenticated or not on the basis of the verification result of the assertion information, and notifies the authentication server 10 of the authentication result context. The control unit 3 acquires, together with the assertion information, the additional information on the user, and generates the authentication result context indicating whether the user is authenticated or not on the basis of verification results of the assertion information and the additional information. The additional information includes at least location information on the user. With this configuration, it is possible to easily introduce the FIDO authentication technology.

Furthermore, as described above, the information processing device (the FIDO server 1) according to the embodiment includes the control unit 3. The control unit 3 acquires, via the authentication server 10, the recovery registration request for the second authenticator that is a backup from the user terminal 30 including the first authenticator, generates the recovery key pair for the second authenticator on the basis of the registration request, stores the public key of the generated key pair in association with the cooperation ID, and stores the secret key in the second authenticator. If the user terminal 30 including the first authenticator is not available, the control unit 3 acquires, from the authentication server 10, the recovery execution request for the second authenticator that is transmitted from the user terminal 30A including the second authenticator, acquires the assertion information obtained by adding, with use of the secret key, a signature to the authentication information that is acquired by the second authenticator on the basis of the recovery execution request, and confirms recovery authority for the second authenticator on the basis of the verification result of the assertion information. The control unit 3 transmits the recovery response in which the recovery authority for the second authenticator is confirmed to the user terminal 30A via the second authenticator. With this configuration, it is possible to recover an account when the registered authenticator is not available.

While the embodiments of the present invention have been explained in detail above based on the drawings, the embodiments are described by way of example, and the present invention may be embodied in various other forms with various changes or modifications based on knowledge of person skilled in the art, in addition to the embodiments described in this specification.

Others

Of the processes described in the embodiments above, all or part of a process described as being performed automatically may also be performed manually. Alternatively, all or part of a process described as being performed manually may also be performed automatically by known methods. In addition, the processing procedures, specific names, and information including various kinds of data and parameters illustrated in the above-described document and drawings may be arbitrarily changed unless otherwise specified. For example, various kinds of information illustrated in each of the drawings are not limited to the information illustrated in the drawings.

Further, the components illustrated in the drawings are functionally conceptual and do not necessarily have to be physically configured in the manner illustrated in the drawings. In other words, specific forms of distribution and integration of the device are not limited to those illustrated in the drawings, and all or part of the devices may be functionally or physically distributed or integrated in arbitrary units depending on various loads or use conditions.

Moreover, the processes described in the embodiment above may be appropriately combined within a scope that does not contradict the processing contents.

Furthermore, "a unit" described above may be replaced with "a section, a module, or a means" or "a circuit". For example, the control unit 3 may be replaced with a control means or a control circuit.

According to one mode of the embodiment, it is possible to recover an account when a registered authenticator is not available.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a control unit that acquires, from an authentication server in a state in which a first authenticator used for Fast Identity Online (FIDO) authentication and a second authenticator used for recovery for the FIDO authentication cooperate with each other, a recovery execution request that is transmitted from a user terminal including the second authenticator to the authentication server, and if the recovery execution request meets a predetermined authentication condition that is set in advance, notifies the user terminal including the second authenticator of a recovery execution permission,
wherein the second authenticator is registered as a backup authenticator for the first authenticator through transmission of a seed registration request from the control unit to the authentication server.

2. The information processing device according to claim 1, wherein the control unit links a key for the first authenticator and a recovery key for the second authenticator by attribute-based encryption.

3. The information processing device according to claim 1, wherein the control unit links a seed for generating a key for the first authenticator and a seed for generating a recovery key for the second authenticator by attribute-based encryption.

4. The information processing device according to claim 1, wherein the control unit acquires, from the authentication server, a recovery registration request for the second authenticator, the recovery registration request being issued from a user terminal including the first authenticator, generates a recovery key pair for the second authenticator on the basis of the recovery registration request, stores a public key of the recovery key pair in the authentication server, and stores a secret key of the recovery key pair in the second authenticator.

5. The information processing device according to claim 2, wherein the control unit confirms recovery authority for the second authenticator by verifying a signature that as added with use of a recovery secret key, with respect to a signed assertion that is obtained by adding, with use of a secret key that is acquired in advance by the second authenticator, a signature to an assertion that is generated based on the recovery execution request, and transmits the recovery execution permission.

6. An information processing method implemented by a computer, the information processing method comprising:
 a control step of acquiring, from an authentication server in a state in which a first authenticator used for Fast Identity Online (FIDO) authentication and a second authenticator used for recovery for the FIDO authentication cooperate with each other, an authenticator verification request that is transmitted from a user terminal including the second authenticator to the authentication server, and notifying, if the authenticator verification request meets a predetermined authentication condition that is set in advance, the user terminal including the second authenticator of a recovery execution permission,
wherein the second authenticator is registered as a backup authenticator for the first authenticator through transmission of a seed registration request to the authentication server.

7. A non-transitory computer-readable recording medium having stored therein an information processing program that causes a computer to execute a process, the process comprising:
 a control step of acquiring, from an authentication server in a state in which a first authenticator used for Fast Identity Online (FIDO) authentication and a second authenticator used for recovery for the FIDO authentication cooperate with each other, an authenticator verification request that is transmitted from a user terminal including the second authenticator to the authentication server, and notifying, if the authenticator verification request meets a predetermined authentication condition that is set in advance, the user terminal including the second authenticator of a recovery execution permission,
wherein the second authenticator is registered as a backup authenticator for the first authenticator through transmission of a seed registration request to the authentication server.

* * * * *